United States Patent
Nakayama

(10) Patent No.: US 7,716,265 B2
(45) Date of Patent: May 11, 2010

(54) DATA TRANSFORMATION APPARATUS AND METHOD

(75) Inventor: Tadayoshi Nakayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1270 days.

(21) Appl. No.: 11/205,052

(22) Filed: Aug. 17, 2005

(65) Prior Publication Data

US 2006/0039626 A1    Feb. 23, 2006

(30) Foreign Application Priority Data

Aug. 23, 2004    (JP) .............................. 2004-242634

(51) Int. Cl.
G06F 17/14    (2006.01)
G06K 9/36    (2006.01)
(52) U.S. Cl. .................. 708/402; 382/281; 382/244; 382/250
(58) Field of Classification Search .................. 382/281
See application file for complete search history.

(56) References Cited

U.S. PATENT DOCUMENTS

| | | | |
|---|---|---|---|
| 5,581,373 A | 12/1996 | Yoshida | 358/476 |
| 5,801,650 A | 9/1998 | Nakayama | 341/67 |
| 5,818,970 A | 10/1998 | Ishikawa et al. | 382/248 |
| 5,841,381 A | 11/1998 | Nakayama | 341/67 |
| 5,986,594 A | 11/1999 | Nakayama et al. | 341/101 |
| 6,058,215 A * | 5/2000 | Schwartz et al. | 382/244 |
| 6,256,422 B1 * | 7/2001 | Mitchell et al. | 382/248 |
| 6,408,102 B1 | 6/2002 | Nakayama | 382/246 |

(Continued)

FOREIGN PATENT DOCUMENTS

JP    2004-038451 A    2/2004

OTHER PUBLICATIONS

Author: Plonka et al. Title: "Integer DCT-II by lifting steps" Date: 2003 URL: http://www.uni-due.de/mathematik/plonka/pdfs/bommer02.pdf.*

(Continued)

Primary Examiner—Lewis A Bullock, Jr.
Assistant Examiner—Joseph Kelly
(74) Attorney, Agent, or Firm—Fitzpatrick, Cella, Harper & Scinto

(57) ABSTRACT

The present invention performs a lossless four-point orthogonal transformation with reduced rounding errors using a simple configuration. A data transformation apparatus receives four items of vector data X0, X1, X2, and X3, $$\begin{pmatrix} Y_0 \\ Y_1 \\ Y_2 \\ Y_3 \end{pmatrix} = \frac{1}{1+a^2} \begin{pmatrix} 1 & a & a & a^2 \\ a & -1 & a^2 & -a \\ a & a^2 & -1 & -a \\ a^2 & -a & -a & 1 \end{pmatrix} \begin{pmatrix} X_0 \\ X_1 \\ X_2 \\ X_3 \end{pmatrix}$$

and determines D0 to D3 as:

$D0 = X0 + aX1 + aX2 + a^2X3;$ $D1 = aX0 - X1 + a^2X2 - aX3;$ $D2 = aX0 + a^2X1 - X2 - aX3;$ and $D3 = a^2X0 - aX1 - aX2 + X3.$ Integer data smaller than half a divisor $\{1+a^2\}$ is added to D1 to determine D1', and a value equal to half the divisor is added to D0, D2, and D3 to determine D0', D2', and D3', respectively. D0', D1', D2', and D3' are divided by the divisor and the results are rounded such that resulting integers are smaller than the results of division, and outputting the resulting integers.

10 Claims, 14 Drawing Sheets

U.S. PATENT DOCUMENTS

| | | | |
|---|---|---|---|
| 6,549,676 B1 | 4/2003 | Nakayama et al. | 382/246 |
| 6,553,143 B2 | 4/2003 | Miyake et al. | 382/239 |
| 6,560,365 B1 | 5/2003 | Nakayama et al. | 382/233 |
| 6,567,562 B1 | 5/2003 | Nakayama et al. | 382/246 |
| 6,587,590 B1 * | 7/2003 | Pan | 382/250 |
| 6,711,295 B2 | 3/2004 | Nakayama et al. | 382/232 |
| 6,792,155 B2 * | 9/2004 | Schwartz et al. | 382/244 |
| 6,807,310 B1 * | 10/2004 | Dugad et al. | 382/248 |
| 6,865,299 B1 | 3/2005 | Nakayama | 382/246 |
| 6,898,310 B1 | 5/2005 | Ohmi et al. | 382/166 |
| 6,952,501 B2 | 10/2005 | Nakayama | 382/243 |
| 6,996,593 B2 | 2/2006 | Nakayama | 708/316 |
| 7,188,132 B2 * | 3/2007 | Nakayama | 708/400 |
| 7,284,026 B2 * | 10/2007 | Nakayama | 708/400 |
| 7,313,286 B2 * | 12/2007 | Schwartz et al. | 382/244 |
| 7,397,853 B2 * | 7/2008 | Kwon et al. | 375/240.03 |
| 7,539,355 B2 * | 5/2009 | Nakayama | 382/281 |
| 2001/0031096 A1 * | 10/2001 | Schwartz et al. | 382/250 |
| 2003/0002743 A1 | 1/2003 | Ohta et al. | 382/239 |
| 2003/0043905 A1 | 3/2003 | Nakayama et al. | 375/240.04 |
| 2003/0086127 A1 | 5/2003 | Ito et al. | 358/462 |
| 2003/0088598 A1 | 5/2003 | Nakayama | 708/300 |
| 2003/0194138 A1 | 10/2003 | Osawa et al. | 382/233 |
| 2003/0228063 A1 | 12/2003 | Nakayama et al. | 382/251 |
| 2004/0258320 A1 | 12/2004 | Nakayama | 382/250 |
| 2005/0276500 A1 | 12/2005 | Nakayama et al. | 382/251 |
| 2005/0276501 A1 | 12/2005 | Nakayama et al. | 382/251 |
| 2006/0039626 A1 | 2/2006 | Nakayama | 382/276 |
| 2007/0025632 A1 | 2/2007 | Nakayama | 382/251 |

OTHER PUBLICATIONS

Author: Jones Title: "Reciprocal Multiplication, A tutorial" Date: 2002 URL: http://www.cs.uiowa.edu/~jones/bcd/divide.html.*
Bruekers, et al. "New Networks for Perfect Inversion and Perfect Reconstruction", IEEE Journal on Selected Areas in Communications, vol. 10, No. 1, pp. 130-137, Jan. 1992.
Komatsu, et al. "Reversible DCT and It's Application to Image Coding", Shingaku-Giho, IE97-83, pp. 1-6, Nov. 1997.

* cited by examiner

DATA TRANSFORMATION APPARATUS AND METHOD

FIELD OF THE INVENTION

The present invention relates to a lossless four-point orthogonal transformation method and lossless four-point orthogonal transformation apparatus which are capable of reversible transform from integer data to integer data.

BACKGROUND OF THE INVENTION

In JPEG, which is an international standard coding system for still images, lossless encoding mode was standardized such that images after compression or decompression would be exactly identical to the original images. However, techniques for lossless transformation had not been studied sufficiently at the time, and it was not possible to implement lossless transformation using DCT. Therefore, using a technique different from DCT-based block transform coding, lossless encoding was implemented by a pixel-based method known as predictive coding.

Later, JPEG-LS, a standard coding technique dedicated to lossless encoding was standardized. The JPEG2000 standardized subsequently implemented both lossless transformation and typical lossy transformation using a technique called wavelet transform, enabling both lossless encoding without degradation and lossy encoding with some degradation.

Compression and transformation processes of image data are roughly divided into three types: spatial conversion process (DCT, wavelet transform, etc.), quantizing process, and entropy encoding process. Among them, the entropy encoding process consists in converting a collection of quantized values (information) into other codes such as Huffman codes, and thereby converting the bit count of the information to a bit count close to that of entropy included in the information. It is a sort of lossless data transformation process.

On the other hand, a quantizing process, which is a process of reducing the amount of information, allows a compression ratio to be controlled. Basically, it is a lossy transformation. Thus, to carry out a transform coding/compression process in a lossless manner, the quantizing process must not be used. However, any decimal part produced by a spatial conversion process must be quantized. Otherwise, the amount of data will increase after the compression.

Any decimal part produced by a spatial conversion process will be converted into an integer using a quantizing step of "1," resulting in signal degradation. Thus, there is no guarantee that the data after the decompression will be identical to the original data.

After all, it can be seen that in order to implement lossless encoding, it is necessary to perform entropy encoding directly instead of quantizing a value (lossless transform coefficient) obtained by a spatial conversion process that outputs integer values whose reversibility is guaranteed. However, it might be said that a quantizing process is performed using a quantizing step of "1" because the transform coefficient is maintained as it is even in that case.

In this way, to implement lossless encoding, a spatial conversion process that outputs integer values whose reversibility is guaranteed (hereinafter referred to as lossless transformation) is indispensable.

Conventionally, ladder networks are available as a technique for implementing lossless transformation (See, for example, F. Bruekers and A. Enden "New Networks for Perfect Inversion and Perfect Reconstruction," IEEE JSAC, vol. 10, no. 1, pp. 130-137, January 1992). A ladder network is obtained by decomposing a two-point rotational transformation matrix into three triangular matrices, replacing each triangular matrix with a ladder operation, and then introducing a rounding process into the ladder operations.

An expansion of the ladder network into a four-point orthogonal transformation is described in an article by Kunitoshi KOMATSU and Kaoru SEZAKI, "Reversible DCT and Its Application to Image Coding," Shingaku-Giho, IE97-83, pp. 1-6, November 1997.

Lossless two-point rotational transformation and lossless four-point orthogonal transformation will be described in more detail below.

A two-point rotational transformation matrix can be decomposed into a product of three triangular matrices whose diagonal elements are "1."

$$\begin{pmatrix} \cos\theta & \sin\theta \\ -\sin\theta & \cos\theta \end{pmatrix} = \begin{pmatrix} 1 & \tan\frac{\theta}{2} \\ 0 & 1 \end{pmatrix} \begin{pmatrix} 1 & 0 \\ -\sin\theta & 1 \end{pmatrix} \begin{pmatrix} 1 & \tan\frac{\theta}{2} \\ 0 & 1 \end{pmatrix}$$

If two items of input data are considered to be two legs of a ladder, operations on triangular matrices whose diagonal elements are "1" structurally correspond to rungs of the ladder. That is, since operations on off-diagonal elements involve multiplying one of the inputs by the values of the off-diagonal elements and adding the product to the other input, they look like rungs of the ladder when represented by a signal flow graph. Thus, two-point rotational transformation can be represented by three-rung ladder operations as shown in FIG. 1A.

As shown in FIG. 1B, by rounding the result of the multiplication process in each ladder operation to an integer, it is possible to easily implement lossless transformation from integer values to integer values. Thus, a lossless transformation by means of ladder operations can be provided by three types of processor: multiplication processors, rounding processors, and addition processors (or subtraction processors in some cases). In FIG. 1B, reference numerals 111, 121, and 131 denote multiplication processors; 113, 123, and 133 denote rounding processors; and 115, 125, and 135 denote addition processors. When a rotational angle is θ, multiplication factors for the multipliers 111, 121, and 131 are TAN(θ/2), −SIN(θ) and TAN(θ/2), respectively.

When the result of multiplication in each step of ladder operations is rounded to an integer, a rounding error always occurs unless the result of multiplication is an integer. The errors which occur in ladder operations are superimposed over output data.

Conventionally, a four-point orthogonal transformation consisting of four two-point rotational transformations is configured as shown in FIG. 2. Here, reference numerals 201 to 204 denote the two-point rotational transformations, each of which consists of a three-rung ladder operation as shown in FIG. 1B. Looking at the entire four-point orthogonal transformation, there are 12 steps of ladder operations. Similarly, rounding is repeated 12 times. Naturally, the rounding error increases in proportion to the number of rounding operations.

On the other hand, the technique described in the article by Kinutoshi KOMATSU and Kaoru SEZAKI, "Reversible DCT and Its Application to Image Coding," Shingaku-Giho, IE97-83, pp. 1-6, November 1997" implements lossless transformation by dividing a four-point orthogonal transformation into five ladder operations expanded to accommodate four-dimensional operations. Since an n-dimensional ladder operation involves n−1 multiplication operations, a four-point orthogonal transformation requires (4−1)×5=15 multiplication operations. However, thanks to the nature of the ladder operation, the rounding can be reduced greatly. In the case of a multi-dimensional ladder operation, since outputs (data to be added) of a ladder operation are collected together, the rounding can be performed after adding up the data, making it possible to get by with a single rounding operation per ladder operation. Thus, the four-point orthogonal transformation according to the above technique can get by with five rounding operations.

As described above, since a lossless transformation requires special operations called ladder operations in order to guarantee its reversibility, fast computational algorithms on which many studies have been conducted cannot be applied to it. This makes it difficult to reduce the amount of computation. In other words, conventional lossless transformations require special operations and are not suitable for fast computation. Also, they involve a large number of rounding operations, resulting in a large rounding error.

SUMMARY OF THE INVENTION

The present invention has been made in view of the above problems and has an object to provide a technique which can be implemented on an apparatus with a simple configuration and which allows a lossless four-point orthogonal transformation to be performed with a reduced rounding error in four items of vector data.

To achieve the above object, the present invention provides a data transformation apparatus which receives four items of vector data X0, X1, X2, and X3 expressed in terms of integers and obtains transformed data expressed in terms of integers by application of a coefficient "a" that is an odd number larger than 1 using a matrix operation:

$$\frac{1}{1+a^2}\begin{pmatrix} 1 & a & a & a^2 \\ a & -1 & a^2 & -a \\ a & a^2 & -1 & -a \\ a^2 & -a & -a & 1 \end{pmatrix}\begin{pmatrix} X_0 \\ X_1 \\ X_2 \\ X_3 \end{pmatrix}$$

the data transformation apparatus comprising:

holding means for receiving and holding the coefficient a and the vector data X0, X1, X2, and X3;

first computational means for performing an operation D0=X0+aX1+aX2+a²X3;

second computational means for performing an operation D1=aX0−X1+a²X2−aX3;

third computational means for performing an operation D2=aX0+a²X1−X2−aX3;

fourth computational means for performing an operation D3=a²X0−aX1−aX2+X3;

allocation means for allocating the coefficient a and the vector data X0, X1, X2, and X3 held by the holding means to the first to fourth computational means;

corrective computational means for adding integer data smaller than half a divisor {1+a²} to at least one item of the data D0, D1, D2, and D3 obtained by the first to fourth computational means and adding a value equal to half the divisor {1+a²} to the rest of the data, and thereby calculating correction data D0', D1', D2', and D3' to be divided; and output means for dividing the correction data D0', D1', D2', and D3' obtained by the corrective computational means by the divisor, rounding results of division in such a way that resulting integers will be smaller than the results of division, and outputting the resulting integers as transformed data.

Other features and advantages of the present invention will be apparent from the following descriptions taken in conjunction with the accompanying drawings, in which like reference characters designate the same or similar parts throughout the figures thereof.

DETAILED DESCRIPTION OF THE PREFERRED EMBODIMENTS

Figure 1A:
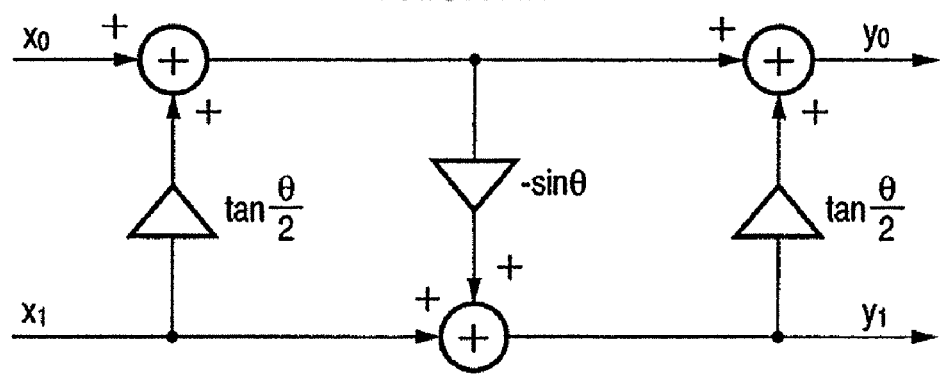
FIGS. 1A and 1B are diagrams showing a configuration of a conventional lossless two-point rotational transformation processor.
Figure 1B:
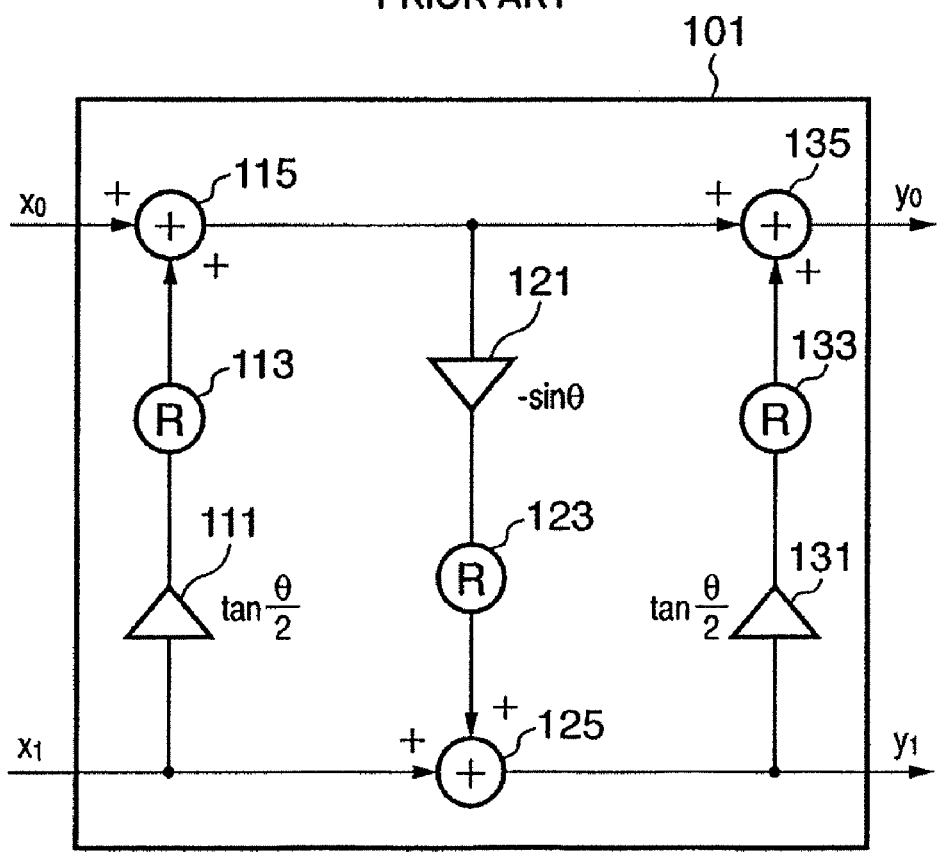
Figure 2:
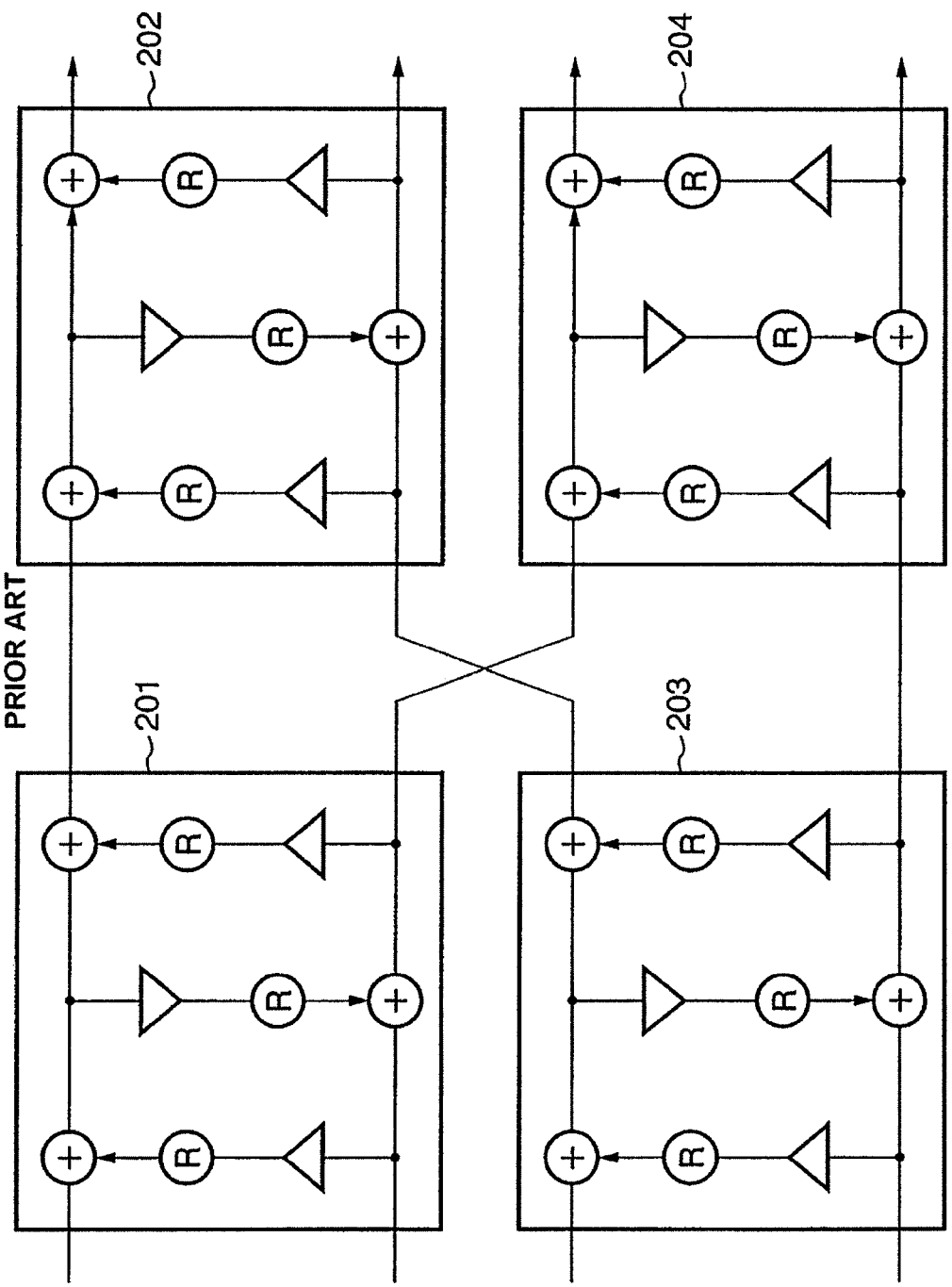
FIG. 2 is a diagram showing a configuration of a lossless four-point orthogonal transformation processor.

Preferred embodiments of the present invention will be described below with reference to the drawings.

First Embodiment

Lossless four-point orthogonal transformation according to the first embodiment does not use conventional ladder operations. It multiplies four items of integer data to be transformed, by a 4-by-4 matrix consisting of integer elements, adds a value equal to half a divisor for use in subsequent division or a value smaller than half the divisor to the integer data, divides the resulting data, and rounds the quotients in such a way that resulting integers will be smaller than the quotients.

According to the first embodiment, a value smaller than half the divisor is added to at least one item of the data. The transformation used by this embodiment is given by Equation (1) below.

$$\begin{pmatrix} Y_0 \\ Y_1 \\ Y_2 \\ Y_3 \end{pmatrix} = \frac{1}{1+a^2} \begin{pmatrix} 1 & a & a & a^2 \\ a & -1 & a^2 & -a \\ a & a^2 & -1 & -a \\ a^2 & -a & -a & 1 \end{pmatrix} \begin{pmatrix} X_0 \\ X_1 \\ X_2 \\ X_3 \end{pmatrix} \quad (1)$$

In the above equation, X0, X1, X2, and X3 are integer data to be transformed and variable "a" is a natural number. An example of a transformation performed by a method considered to be normal by those skilled in the art will be shown below. It is assumed here that a=3 and that the four items of data X0, X1, X2, and X3 have the following values, respectively.

17, 12, 9, 55

However, before dividing the data by (1+a*a)=10, (1+a*a)/2=5 is added to each item of the data being operated on so that the transformation will produce integer values. The following values result.

58, −4, −1, 15

The above values are retransformed by the same transformation process into the following values.

18, 12, 9, 55

Equation (1) above is a mathematically reversible transform and is in itself an inverse transformation. That is, if the transformation in Equation (1) is repeated twice without rounding the data to integers, the resulting data return to their original forms, and thus the data after two transformations coincide with the untransformed data.

However, this does not apply to the above result. This is because rounding errors occur when the results of the first transformation are rounded to integers, they are concentrated on the first data X0 at the time of the inverse transformation, and they cannot be cancelled off by rounding-off at the time of the inverse transformation.

Now let us look at rounding errors in more detail. A division by 10 will produce a decimal part on the order of 0.1. If a decimal part of 0.1 to 0.4 is truncated and a decimal part of 0.6 to 0.9 is raised to a unity, a rounding error of up to ±0.4 occurs. The error is symmetrical around zero.

On the other hand, if the decimal part is 0.5, raising it to a unity produces a rounding error of +0.5 and truncating it produces a rounding error of −0.5. The error is asymmetrical around zero. Since the process of rounding off raises the decimal part of 0.5 to a unity, it produces asymmetrical errors of +0.5.

Thus, the reason why the data do not return to their original forms in the transformation and inverse transformation processes described above lies in such asymmetrical errors. Since the reason lines in asymmetrical errors, truncating the decimal part of 0.5 produces an asymmetrical error of −0.5. Again, the data going through a transformation and inverse transformation do not return to their original forms.

This embodiment implements lossless transformation from integer values to integer values based on Equation (1). For that, the applicant proposes a forward transformation process shown in FIG. 3 and inverse transformation process shown in FIG. 4. These are characteristic features of the present invention.

Figure 3:
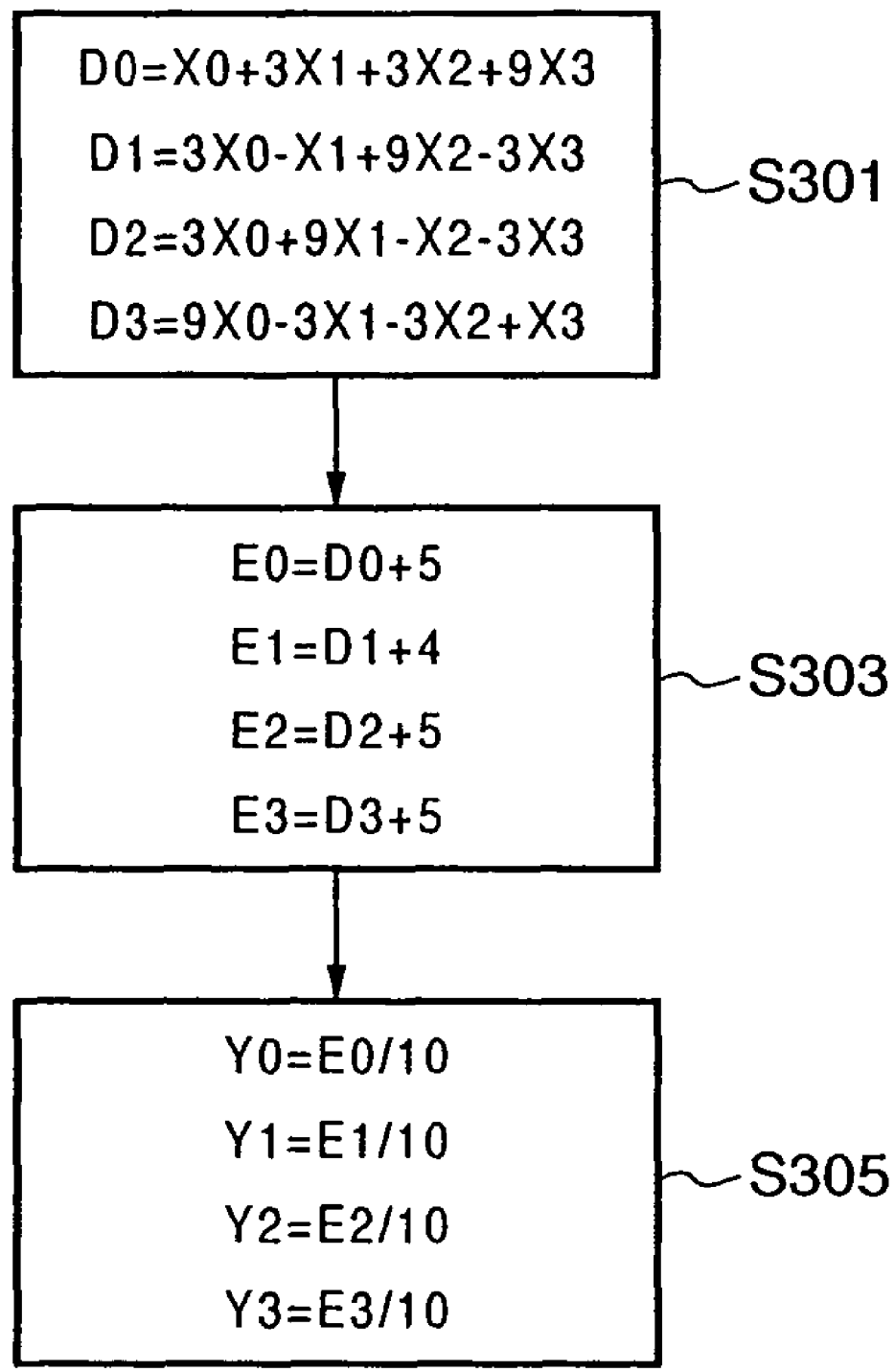
FIG. 3 is a diagram showing a flow of a lossless transformation process according to a first embodiment.
Figure 4:
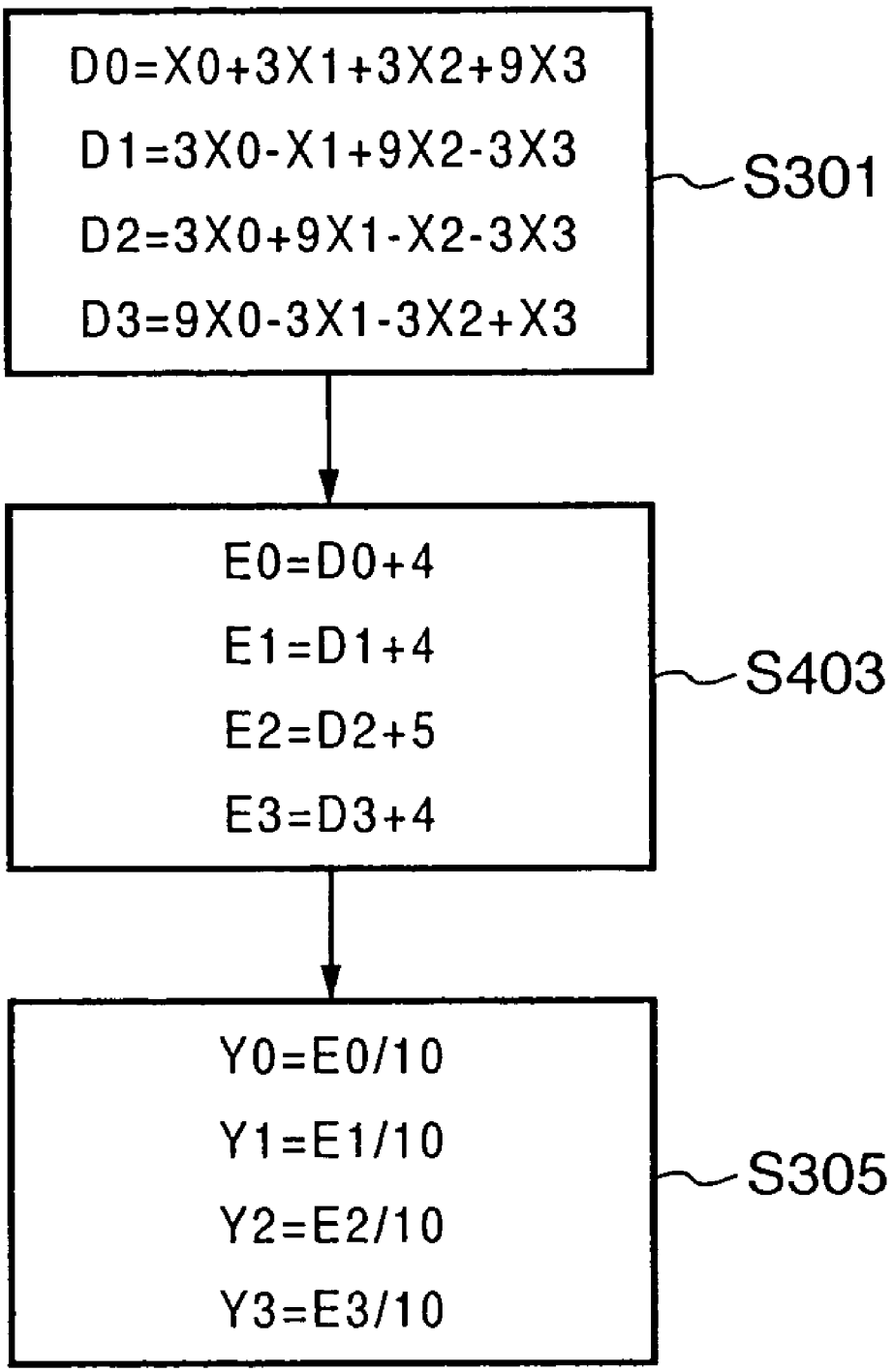
FIG. 4 is a diagram showing a flow of an inverse transformation process of the lossless transformation process according to the first embodiment.

In FIG. 3, Step S301 is a sum-of-products computation process, Step S303 is an addition process, and Step S305 is a division process. FIG. 4 is about the same as FIG. 3, but differs more or less in the addition process in Step S403. Processing in this embodiment is characterized in that some of the values added in Steps S303 and S403 are smaller than half the divisor (=$a^2$+1).

Specifically, a value "4" smaller than half (=5) the divisor (=10) is added in the second addition operation in Step S303 and the addition operations in Step S403 except the third addition operation. The forward transformation process and inverse transformation process by the use of this addition process produce the following results.

After forward transformation process: 58, −5, −1, 15
After inverse transformation process: 17, 12, 9, 55

It can be seen that the data after the inverse transformation process are identical to the original data. This shows that the method according to this embodiment can implement a lossless transformation as with conventional methods which employ ladder operations.

Incidentally, the forward transformation process and inverse transformation process are complementary to each other. That is, if data undergo an inverse transformation process and forward transformation process in this order, they also return to their original forms. Thus, the process in FIG. 4 is a type of forward transformation process. In that case, naturally the inverse transformation process corresponds to the process shown in FIG. 3. When the process in FIG. 4 is used as a forward transformation process, a value smaller than half the divisor is added to three items of data.

Figure 14:
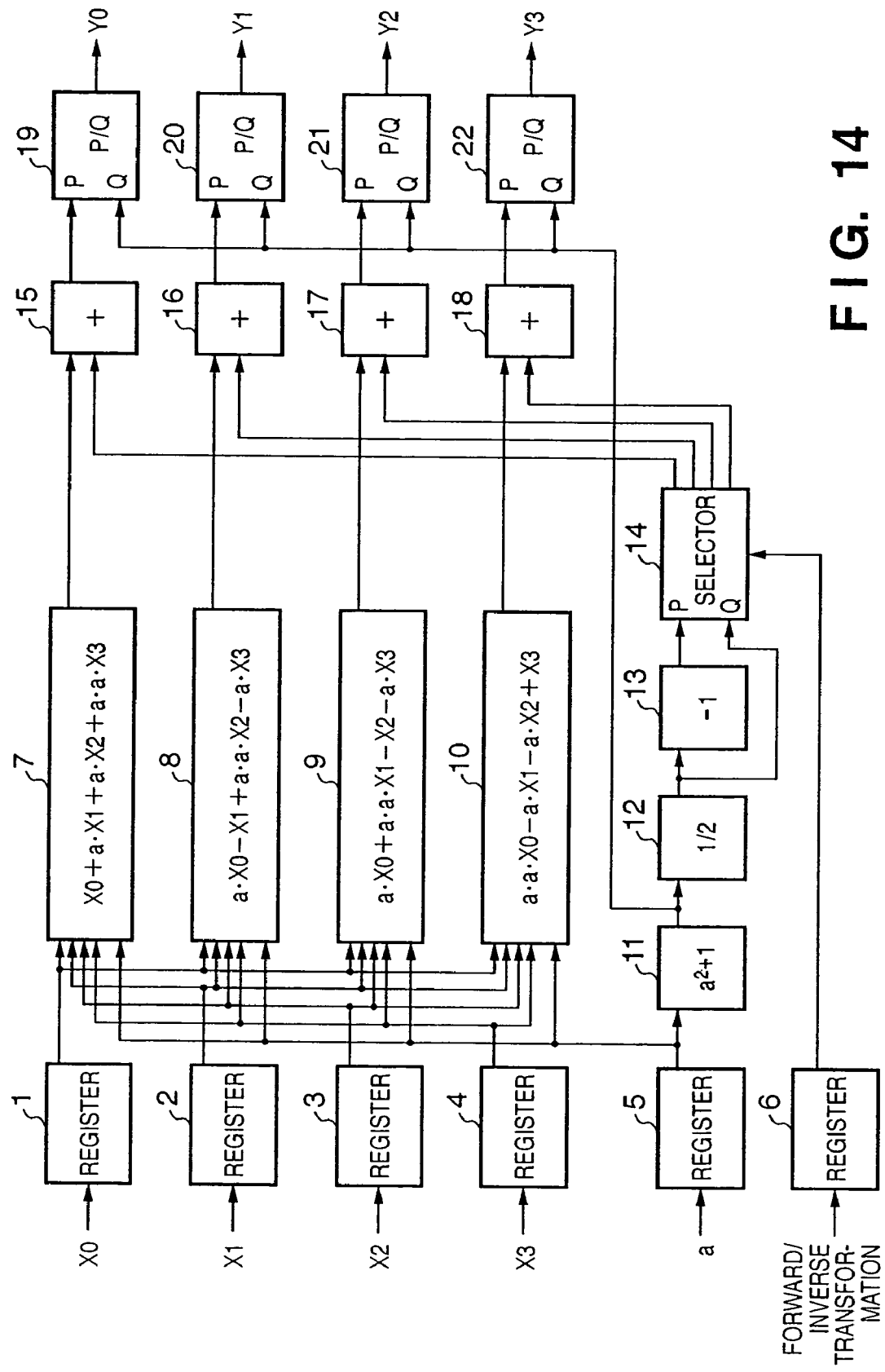
FIG. 14 is a diagram showing a circuit configuration for lossless transformations according to the first embodiment.

FIG. 14 is a diagram showing a concrete circuit configuration for use to carry out the processes shown in FIGS. 3 and 4. Note that all the components in FIG. 14 handle integer data. That is, in the "division" described below, any remainder or decimal part is discarded.

In FIG. 14, reference numerals 1 to 5 denote registers which hold multiple bits of data, of which the registers 1 to 4 hold the source data X0 to X3 while the register 5 holds the value a. Reference numeral 6 also denotes a register, which holds one bit of data and switches between forward transformation (FIG. 3) and inverse transformation (FIG. 4).

Reference numerals 7 to 10 denote integer computing units which receive data from the registers 1 to 5, respectively, and perform the operations shown in the figures. The integer computing units 7 to 10 perform operations which correspond to Step S301 in FIG. 3 and Step S401 in FIG. 4. They consist of adders and multipliers, and do not produce computational errors.

Reference numeral 11 also denotes a register, which raises the value a stored in the register 5 to the second power, adds "1" to the square, and outputs the resulting value "a*a+1." Reference numeral 12 denotes a divider which divides input data by 2. Since division by 2 can be achieved by a 1-bit right shift (to the higher-order bit), the divider 12 can be constituted of a bit shifter. Reference numeral 13 denotes a subtracter which subtracts "1" from the output data of the divider 12.

Reference numerals 15 to 18 denote adders each of which adds two items of input data and outputs the result. Reference numerals 19 to 22 denote dividers each of which divides data at an input terminal P by data at an input terminal Q.

Reference numeral 14 denotes a selector which selects data inputted in input terminals P and Q according to a value (0 or 1) set on the register 6 and outputs the selected data to the adders 15 to 18. Specifically, when a value "0" (forward transformation) is set on the register 6, the selector 14 outputs the data inputted through the input terminal P to-the adder 16 and outputs the data inputted through the input terminal Q to the adders 15, 17, and 18. On the other hand, when a value "1" (inverse transformation) is set on the register 6, the selector 14 outputs the data inputted through the input terminal P to the adders 15, 16, and 18 and the data inputted through the input terminal Q to the adder 17.

More specifically, when "0" is set on the register 6, "(a*a+1)/2−1" is supplied to the adder 16 and "(a*a+1)/2" is supplied to the adders 15, 17, and 18. On the other hand, when "1" is set on the register 6, "(a*a+1)/2" is supplied to the adder 17 and "(a*a+1)/2−1" is supplied to the adders 15, 16, and 18. If the transformation performed when "0" is set on the register 6 is regarded to be a forward transformation, it follows that the transformation performed when "1" is set on the register 6 is a inverse transformation. However, forward and inverse transformations are relative and if the transformation performed when "1" is set on the register 6 is regarded to be a forward transformation, it follows that the transformation performed when "0" is set on the register 6 is an inverse transformation.

Still more specifically, when "3" is set as the value a on the register 5, if the register 6 is set to "0," the adders 15 to 18 perform the process of Step S303 in FIG. 3. On the other hand, if the register 6 is set to "1," the adders 15 to 18 perform the process of Step S403 in FIG. 4.

Consequently, the circuit configuration FIG. 14 makes it possible to switch between forward transformation and inverse transformation.

Note that there are addition methods other than those in Steps S303 and S403. As an example, in Step S303, the order in which the addition operation of "4" is performed may be changed from the second to the third. In the corresponding inverse transformation, "5" is added in the second addition operation and "4" is added in an addition operation other than the second.

According to this embodiment, the value of a is not limited to "3". The value of a may be the inverse (1/n) of an odd number (n) equal to or larger than 3. This is because although the signs of the coefficient "1" and coefficient "$a^2$" are changed and the variable a is replaced by n if the entire Equation (1) is multiplied by $n^2$, the same transformation as that of the original Equation (1) results if the data before and after the transformation are replaced.

Furthermore, although replacement of rows or reversal of signs in the orthogonal transformation matrix in Equation (1) can change correspondence between the forward transformation and inverse transformation, it goes without saying that modifications of processes in this category are also included in the scope of this embodiment.

Although this embodiment is described as a data transformation method, a lossless data transformation apparatus can be implemented if computing units which perform arithmetic operations are connected and made to process data according to the flow in FIGS. 3 and 4. This is something those skilled in the art can easily think of.

When the value of a is an even number, the divisor (1+a*a) is an odd number, and thus the value equal to half the divisor is an integer +0.5. In this case, if only the integer parts are added in all the four addition operations, a lossless transformation results. In this situation, the divisor can be added in each addition operation, after being right shifted one bit.

For that, the subtracter 13 in FIG. 14 can discard the least significant bit (LSB) of the value a. That is, when the value of a is an even number, since the LSB is "0," the subtracter 13 outputs the integer part without subtracting "1". In this case, the values at the input terminals P and Q are identical, and thus the output is the same whichever input may be selected.

Second Embodiment

On hardware, processing can be facilitated if divisions are replaced with multiplications. Such replacement of operations can speed up even a microcontroller which processes divisions at a low speed. For that, in the second embodiment, the division operations in the transformation based on Equation (1) are replaced by multiplication operations which use the inverse of the divisor and in which any decimal part is truncated.

A whole number in decimal notation may have an infinite decimal in the binary notation used internally by a processor. Number 0.1 which is the inverse of 10 becomes $0.0001\underline{1001}_2$ (the underlined portion is a repeating decimal) when expressed as a binary number.

Since infinite decimals cannot be handled in arithmetic operations, the repeating decimal must be rounded to a finite decimal. In so doing, normally the number is rounded up or rounded down depending on the number of digits to be obtained as a result of the rounding. For example, when rounding the recurring decimal to nine decimal places (bits), rounding it to $0.000110011_2$ involves the smallest error. When rounding the recurring decimal to eleven decimal places (bits), rounding it to $0.00011001101_2$ involves the smallest error. In effect, the former process involves rounding down the number and the latter process involves rounding up the number.

According to this embodiment, two types of finite decimal are prepared and used selectively: a finite-bit decimal obtained by rounding off the original decimal and finite-bit decimal obtained by rounding down the original decimal. It is common practice to use fixed decimal mode to manage the rounding-down and rounding-up of decimals with a large number of significant bits.

Figure 5:
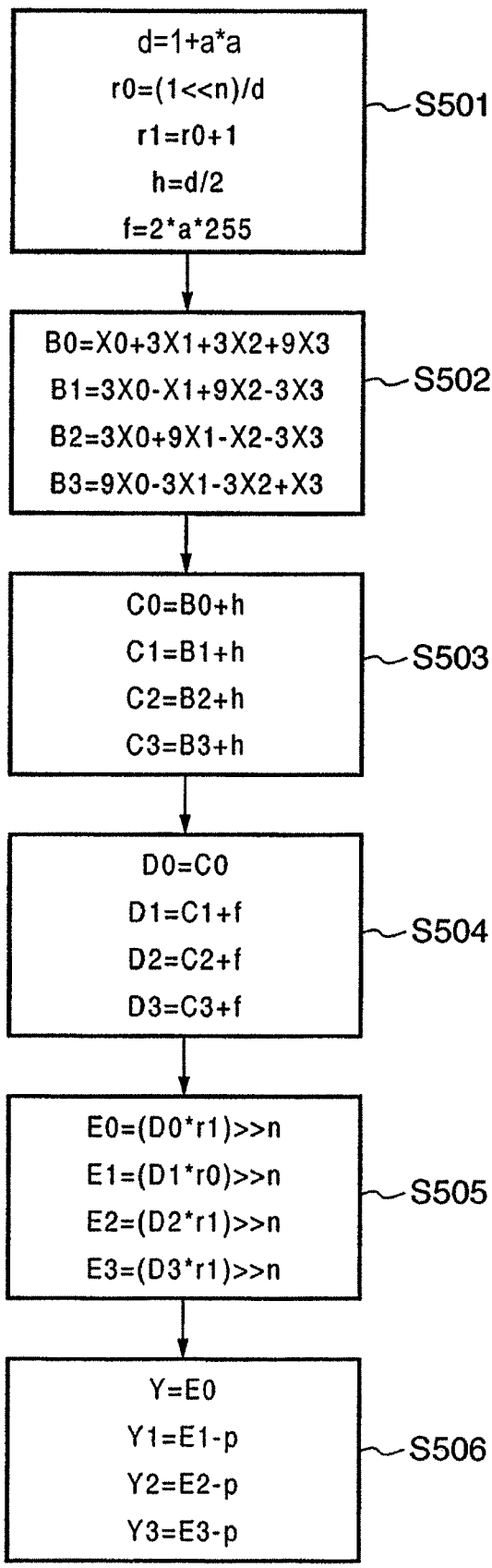
FIG. 5 is a diagram showing a flow of a lossless transformation process according to a second embodiment.

For that, in Step S501 in FIG. 5 which represents processes of the second embodiment, fixed point numbers are calculated by rounding up or rounding down the inverse of a divisor to predetermined bits. Let n denote a significant bit count of the fixed point numbers and let d denote the divisor (1+a*a). When the remainder produced by dividing the n-th power of 2 (obtained by left-shifting 1 by n bits) by d is other than 0 (this condition is regarded to be normal according to this embodiment), the quotient is the inverse r0 of the fixed point number obtained by rounding-down. The weight of the least significant bit of the inverse is $2^{-n}$. The inverse r0 plus 1 equals the inverse r1 of the fixed point number obtained by rounding-up. The method for determining the significant bit count n will be described later.

The remainder equals 0 only when the divisor (1+a*a) is a power of 2. Except when a=1, there can be no such situation at least as far as one can imagine (such a situation is inconceivable even mathematically). In addition to the divisor d, inverse r0, and inverse r1, a value h equal to half the divisor d as well as an offset f are determined.

The calculations in Step S501 described above have to be performed only once before a large amount of data such as image data go through an orthogonal transformation.

The lossless four-point orthogonal transformation described below is performed using the two types of inverse calculated above.

First, a sum-of-products computation process is performed in Step S502 using exactly the same process as in Step S301 in FIG. 3. Next, a value equal to half the divisor described above is added in a first addition process in Step S503. Only one type of value is added here although two types of value—a value equal to half the divisor and a value smaller than half the divisor—are added according to the first embodiment described above.

In a second addition process in Step S504, an offset is added to computational results in the second to fourth rows of the transformation matrix. The purpose of adding the offset is to level-shift the multiplicand to be multiplied by the inverse to a value larger than 0. Thus, the offset should be large enough to level-shift the smallest possible value (negative value) obtained in Step S503 to a value larger than 0. The offset can be calculated by multiplying negative elements in the transformation matrix of Equation (1) by the maximum input values and summing up the products (assuming that the data to be processed are equal to or larger than 0). The offset is not added to the computational result in the first row, which cannot be negative because there is no subtraction.

Looking at the fourth row in the transformation matrix, since there are two elements of −a, if it is assumed that a=3 and that the maximum input value is 255, the offset should be 3×255×2=1530. Also, the offset must be an integral multiple (p times) of the divisor (1+a*a) for the reason described later. When a=3, the divisor is 10 and the calculation result "1530" satisfies this condition and is used as the offset. In this case, p=153.

In the transformation matrix of Equation (1), all the terms of the second power of a are positive, but when using a transformation matrix in which terms of the second power of a are negative due to sign reversal or the like, the value of the offset must be increased.

In a multiplication process of Step S505, the division process of Step S305 is replaced with multiplication by the inverse r0 or r1 of the fixed point number and a subsequent bit shift.

Finally, in a subtraction process of Step S506, p (=153) is subtracted. This process is used to remove the offset added in Step S504. To remove the offset completely here, the offset must be an integral multiple (p times) of the divisor as described above.

Although the same offset is added in the second to fourth rows of the transformation matrix, it can be seen that an offset smaller than "1530" may be added in the second and third rows. Specifically, the offset may be (1+3)×255=1020.

If the minimum necessary offsets are added, the maximum value of the computational result in each row after the addition of the offset is (1+3+3+9)×255+5=4085. If the common offset is used, the maximum value increases by "510," which is the difference between 1530 and 1020. Thus, the maximum value is "4595."

On the other hand, regarding the inverse r0 of the rounded-down number and inverse r1 of the rounded-up number, their accuracy should be maintained so that the error resulting from multiplication by them will be less than 1/10 in absolute value. This is to allow computational results to be distinguished in units of 1/10. For this purpose, the range of the inverses is specified between $$\frac{1}{10}\left(1 - \frac{1}{4596}\right) \text{ and } \frac{1}{10}\left(1 + \frac{1}{4596}\right).$$

Thus, the error in the inverses must be less than 1/45960 in absolute value. This error corresponds to computational accuracy of 15.5 bits, and thus the accuracy of the inverses should be 16 bits which is higher than 15.5 bits. Here comes the value n=16 at last.

Now, actual computational results will be discussed using the parameters described above.

The inverse r0 of the approximate value obtained by rounding down 1/10 to 16 bits is $2^{16} \div 10 = 6553$ and the inverse r1 of the approximate value obtained by rounding-up is 6554 (since fixed-point representation is used, the actual weight of 1 is 1/65536). Based on these parameters, results of various processes are shown below.

Original data: 247, 252, 9, 5

After computation of sum of products: 1075, 555, 2985, 1445

After first addition process: 1080, 560, 2990, 1450

After second addition process: 1080, 2090, 4520, 2980

After multiplication by inverse and subsequent shift: 108, 208, 452, 298

After subtraction of offset: 108, 55, 299, 145

Figure 6:
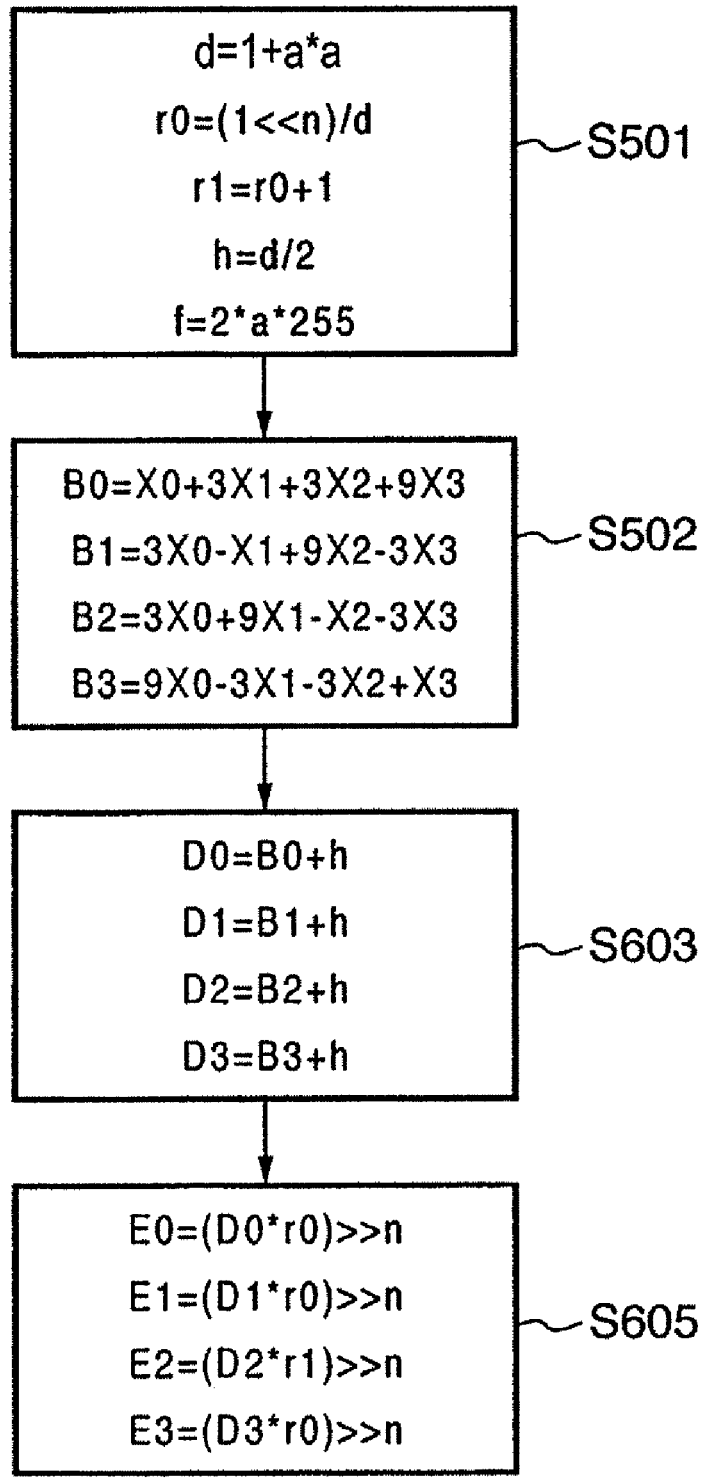
FIG. 6 is a diagram showing a flow of an inverse transformation process of the lossless transformation process according to the second embodiment.

The values after the subtraction of the offset are the results obtained by the lossless transformation process according to the second embodiment. The results of the transformation are returned to the original data by the inverse transformation process shown in FIG. 6. As in the case of the first embodiment, the inverse transformation process in FIG. 6 is basically the same as the forward transformation process, but differs in the following points.

As described above, the original data ranges from 0 to 255. Thus, the values after the inverse transformation also range from 0 to 255. Even if negative values are contained in intermediate computational results, they become equal to or larger than 0 in the end after the value h equal to half the divisor is added. Consequently, the inverse transformation process does not need the offset addition process (Step S504) and the subtraction process (Step S506) used to cancel off the addition process. The order of multiplications by the inverses r0 and r1 in the inverse transformation process is changed according to the order of multiplications by the inverses r0 and r1 in the forward transformation process. Step S605 is the process in which the order of multiplications by the inverses r0 and r1 is changed (a symbol ">>" in FIG. 6 indicates a bit shift to a lower-order bit).

If the range of the original data is expanded to negative-values, the inverse transformation process also needs the offset addition process (Step S504) and the subtraction process (Step S506) used to cancel off the addition process. This results in almost the same processes as in FIG. 5, the difference being only Step S605.

Results of individual steps in the inverse transformation process performed after the lossless transformation process are shown below.

Results of transformation: 108, 55, 299, 145

After computation of sum of products: 2475, 2525, 85, 55

After first addition process: 2480, 2530, 90, 60

After multiplication by inverse and subsequent shift: 247, 252, 9, 5

It can be seen that the data after the inverse transformation process are identical to the original data. The inverses r0 and r1 can be handled in various ways in Step S605 as is the case with the first embodiment.

It will be understood easily from the above description that according to the second embodiment as in the case of the first embodiment described with reference to FIG. 14, a lossless data transformation apparatus can be implemented if computing units which perform arithmetic operations are made to process data according to the flow in FIGS. 5 and 6.

Third Embodiment

In the third embodiment, description will be given of how a lossless transformation is implemented when the value of a is an even number (2n). When a=2 (n=1), a lossless transformation can be implemented by simply using a rounding-off process (or an equivalent process) without problems, and thus description will be given of cases where the value of n is 2 or larger.

When a is an even number, since the divisor (1+a*a) is an odd number, no division process produces a decimal part which would be equal to 0.5. Thus, there are no problems such as those encountered when a is an odd number. However, other problems arise. Specifically, a lossless transformation cannot be achieved with the rounding-off or equivalent process alone and the techniques available when a is an odd number are not available.

When a=2n (n≧2), if large rounding errors are produced by rounding-off processes during a forward transformation, they cannot be cancelled off by rounding-off processes during the inverse transformation. Consequently, there is no lossless transformation.

To solve this problem, such a large rounding error in a forward transformation that cannot be cancelled off by a rounding-off process during the inverse transformation is subjected to a rounding process opposite to rounding-off. Specifically, a decimal part truncated in the case of rounding-off is raised to a unity and a decimal part raised to a unity in the case of rounding-off is truncated. Hereinafter, this process will be referred to as a reverse rounding-off process to distinguish from the normal rounding-off process.

The range of the rounding error to be subjected to a reverse rounding-off process is given by 2n*n−n+1≦T≦2n*n−1, where T is the value obtained by multiplying the absolute value of the rounding error by the divisor (1+a*a).

Conceptually, the process is as described above. However, it is inefficient to find a rounding error by performing a rounding-off process once, determine whether the rounding error is subject to the reverse rounding-off process, and perform a rounding process again. Thus, as an equivalent process, it is more realistic to add or subtract 1 to/from the result of transformation in such a way as to reverse the sign of the rounding error.

Specifically, a rounding error "−(2n*n−1)," for example, is a result of a rounding-down process. Since the absolute value of this rounding error is subject to a reverse rounding-off process, a rounding-up process rather than a rounding-down process should be used.

If rounding-down is changed to rounding-up, the result of transformation increases by 1. Therefore, when a rounding error is negative and its absolute value is subject to a reverse rounding-off process, it is only necessary to increase the result of transformation by 1. Similarly, when a rounding error is positive and its absolute value is subject to a reverse rounding-off process, it is only necessary to decrease the result of transformation by 1.

Now, description will be given of the fact that results of transformation subject to a reverse rounding-off process always come in pairs.

If a rounding-off process is applied to the transformation process in Equation (1), the rounding errors produced by the first and fourth results of the transformation are always opposite in sign. This is apparent when the fourth transformation formula is rewritten as follows.

$$\frac{1}{1+a^2}(a^2 X_0 - aX_1 - aX_2 + X_3) = \qquad (2)$$

$$X_0 + X_3 + \frac{1}{1+a^2}(-X_0 - aX_1 - aX_2 - a^2 X_3)$$

It can be seen that the last term which produces a decimal part has a sign opposite to that of the first transformation. Similarly, the rounding errors produced by the transformation result of the second and third rows are always equal. This is apparent when the third transformation formula is rewritten as follows.

$$\frac{1}{1+a^2}(aX_0 + a^2 X_1 - X_2 - aX_3) = \qquad (3)$$

$$X_1 - X_2 + \frac{1}{1+a^2}(aX_0 - X_1 + a^2 X_2 - aX_3)$$

It can be seen that the last term which produces a decimal part is the same as the second transformation.

In this way, there are always two transformation results whose rounding errors are equal in absolute value. Thus, results of transformation subject to the reverse rounding-off process always come in pairs, but to achieve a lossless transformation, only one of the two needs to be subjected to the reverse rounding-off process.

The processes described above are shown in FIGS. 7 and 8 in the form of a flowchart.

In the figures, Steps S701 to S717 correspond to the following processes.

S701 is a parameter calculation process for reducing repetition of the same calculations;

S703 is a sum-of-products computation process for calculating products of four input vectors and an integer transformation matrix;

S705 is an addition process for adding ½the divisor to allow rounding-off in the next subtraction process;

S707 is a process for dividing data, rounding the quotients in such a way that resulting integers will be smaller than the quotients, and obtaining results of transformation;

S709 is a process for multiplying rounding errors by the divisor (1+a*a);

S711 is a process for judging the magnitude of the rounding error in the first transformation result in absolute value;

S713 is a process for judging the sign of the rounding error in the first transformation result;

S715 is a process for subtracting 1 from the first transformation result;

S717 is a process for adding 1 to the first transformation result;

S721 is a process for judging the magnitude of the rounding error in the second transformation result in absolute value;

S723 is a process for judging the sign of the rounding error in the second transformation result;

S725 is a process for subtracting 1 from the second transformation result;

S727 is a process for adding 1 to the second transformation result;

Description will be given below of the processes in Step S709 and subsequent steps, which are characteristic of this embodiment.

The reason for multiplying the rounding errors by (1+a*a) in Step S709 is to convert them into integer values and thereby obtain accurate values of the rounding errors. To put it the other way around, it is not strictly necessary to multiply them by (1+a*a) as long as their accurate values can be obtained.

In Steps S711 and 721, it is judged whether each of the two rounding errors E0 and E1 multiplied by (1+a*a) falls within a range subject to an inverse transformation process.

If it is found that the rounding error E0 is subject to an inverse transformation process, it is judged in Step S713 whether the rounding error E0 has a positive or negative sign. If the rounding error E0 is positive, 1 is subtracted from the transformation result Y0 obtained in Step S707 (Step S715), and if the rounding error E0 is negative, 1 is added to Y0 (Step S717).

If it is found that the rounding error E1 is subject to an inverse transformation process while the rounding error E0 is not, it is judged in Step S723 similarly whether the rounding error E1 has a positive or negative sign. If E1 is positive, 1 is subtracted from the transformation result Y1 obtained in Step S707 (Step S725), and if E1 is negative, 1 is added to Y1 (Step S727).

The above processes results in a lossless transformation. A concrete calculation example will be shown below assuming that a=8 (n=4). When the four items of input data X0, X1, X2, and X3 have the following values, the results of transformation after rounding-off and the rounding errors multiplied by (1+a*a) are as follows.

Values obtained by subjecting the results of transformation to simple rounding-off and subsequently to an inverse transformation are also listed for the purpose of reference. It can be seen that they differ slightly from the values of the input data.

Input data: 5, 33, 43, 0
Results of transformation: 9, 42, 32, −4
Rounding error: −28, −29, −29, 28
Results of inverse transformation: 5, 32, 42, 0 (reference)

It can be confirmed that the first and fourth rounding errors are opposite in sign and that the second and third rounding errors are equal, as described earlier. Since the second rounding error of −29 is negative in sign and falls within a rage of 29 to 31 ("2n*n−1" to "2n*n−n+1") in absolute value, 1 is added to the second transformation result. This results in a lossless transformation as follows.

Results of lossless transformation: 9, 43, 32, −4

Figure 7:
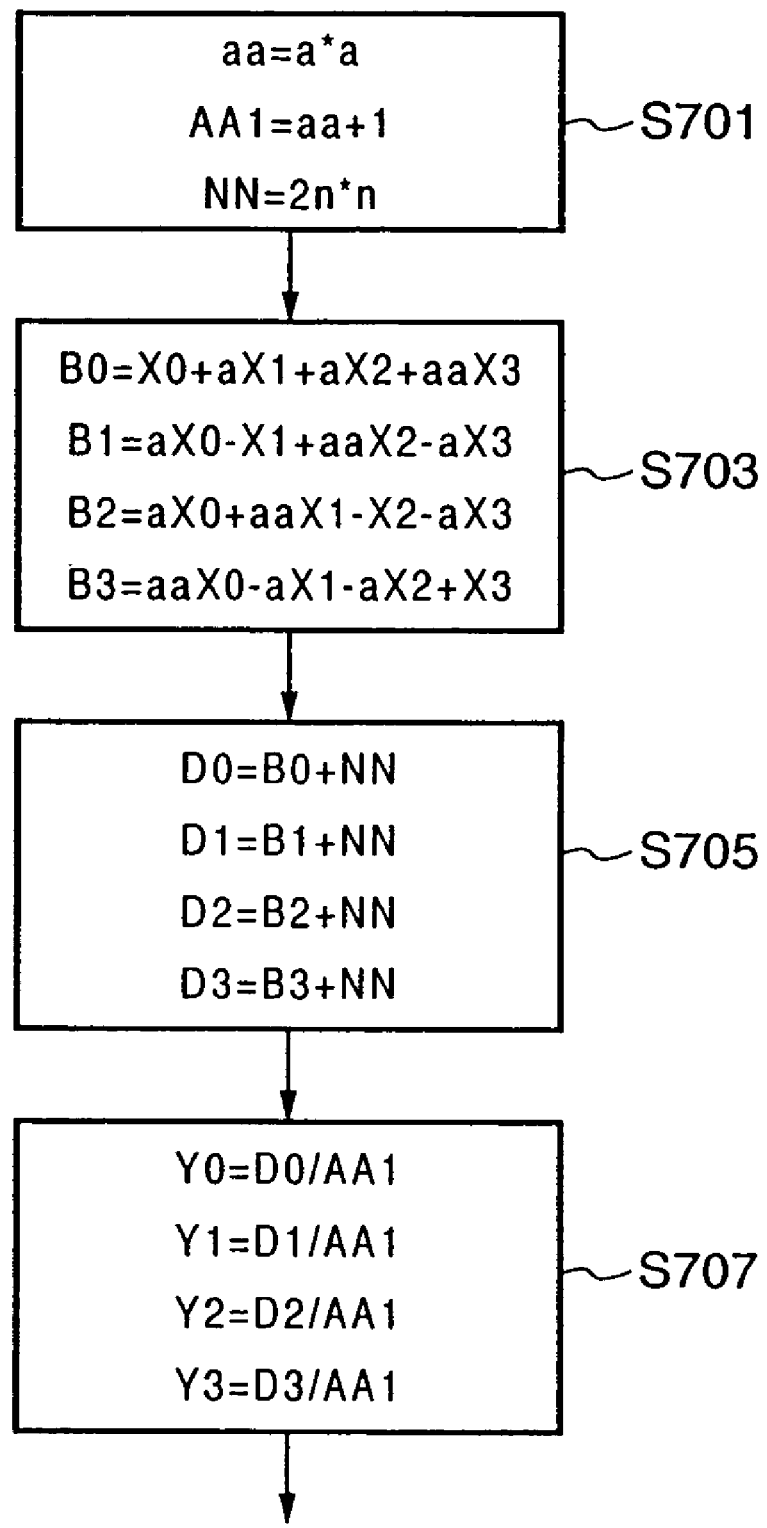
FIG. 7 is a diagram showing a flow of a lossless transformation process according to a third embodiment.
Figure 8:
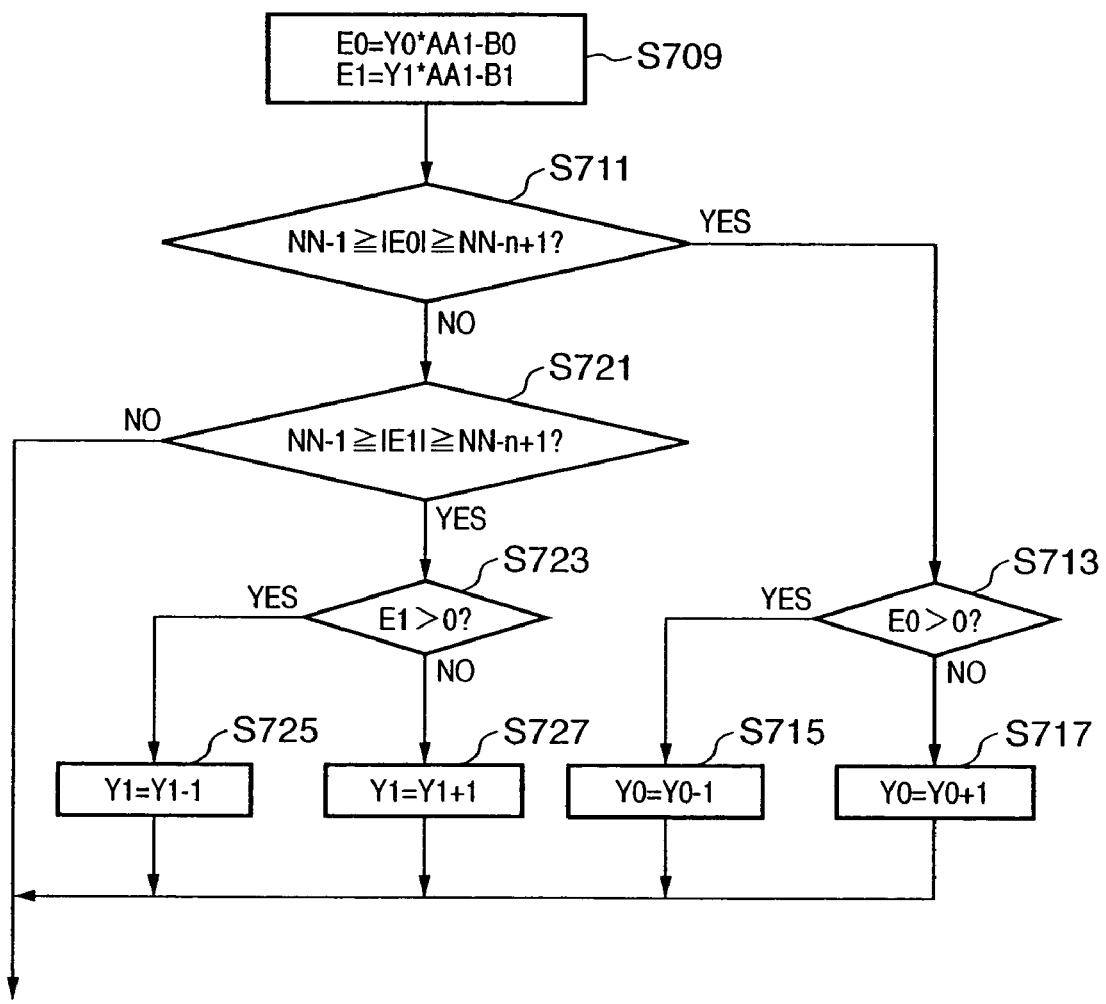
FIG. 8 is a diagram showing a flow of the lossless transformation process according to the third embodiment.

The processes used to restore the original data by inverse-transforming the results of lossless transformation are exactly the same as those shown in FIGS. 8 and 7. The results of the inverse transformation in Step S707, rounding errors produced by the inverse transformation, and results of the inverse transformation obtained by adding 1 to the second transformation result are as follows.

Results of inverse transformation (S707): 5, 32, 43, 0
Rounding error: −28, −29, −29, 28
Results of inverse transformation (after addition/subtraction of 1): 5, 33, 43, 0

In this embodiment, although the first or second transformation result is subjected to a reverse rounding-off process, any combination of the first or fourth transformation result and the second or third transformation result may be subjected to the reverse rounding-off process as long as the forward transformation process and inverse transformation process are identical.

The forward transformation process and inverse transformation process are identical only when the transformation formula in Equation (1) is used. If rows in the transformation matrix are replaced, the forward transformation process and inverse transformation process are no longer identical. However, if the transformation matrix is defined properly and the forward transformation process is established, the inverse transformation process is determined uniquely. Modifications of processes made through replacements in the transformation matrix are also included in the scope of the present invention.

There are many methods for judging the magnitudes of rounding errors. According to this embodiment, rounding errors are multiplied by the divisor to handle them by integer arithmetic which allows accurate description. However, since actual rounding errors can be smaller than 1 in absolute value, they may be handled as floating point data or fixed point data in judging their magnitudes. Furthermore, instead of judging the magnitudes of rounding errors in absolute value and applying different processes depending on whether the rounding errors are positive or negative, it is also possible to judge the magnitudes of negative rounding errors and positive rounding errors by separate methods and use different processes based on the results of the judgment.

Although this embodiment is described as a data transformation method, a lossless data transformation apparatus can be implemented if computing units which perform arithmetic operations are connected and made to process data, a comparator is used to judge the magnitudes of rounding errors, and computational results are switched with a selector based on the results of judgment, all according to the flow in FIGS. 7 and 8. This is something those skilled in the art can easily think of.

Fourth Embodiment

Whereas according to the third embodiment, it is judged whether the absolute values of rounding errors fall within a range subject to an inverse transformation process, according to the fourth embodiment, it is judged whether to apply an inverse transformation process based on modulo d (where d is a divisor), i.e., the remainder when the result of the sum-of-products computation process is divided by the divisor.

Figure 9:
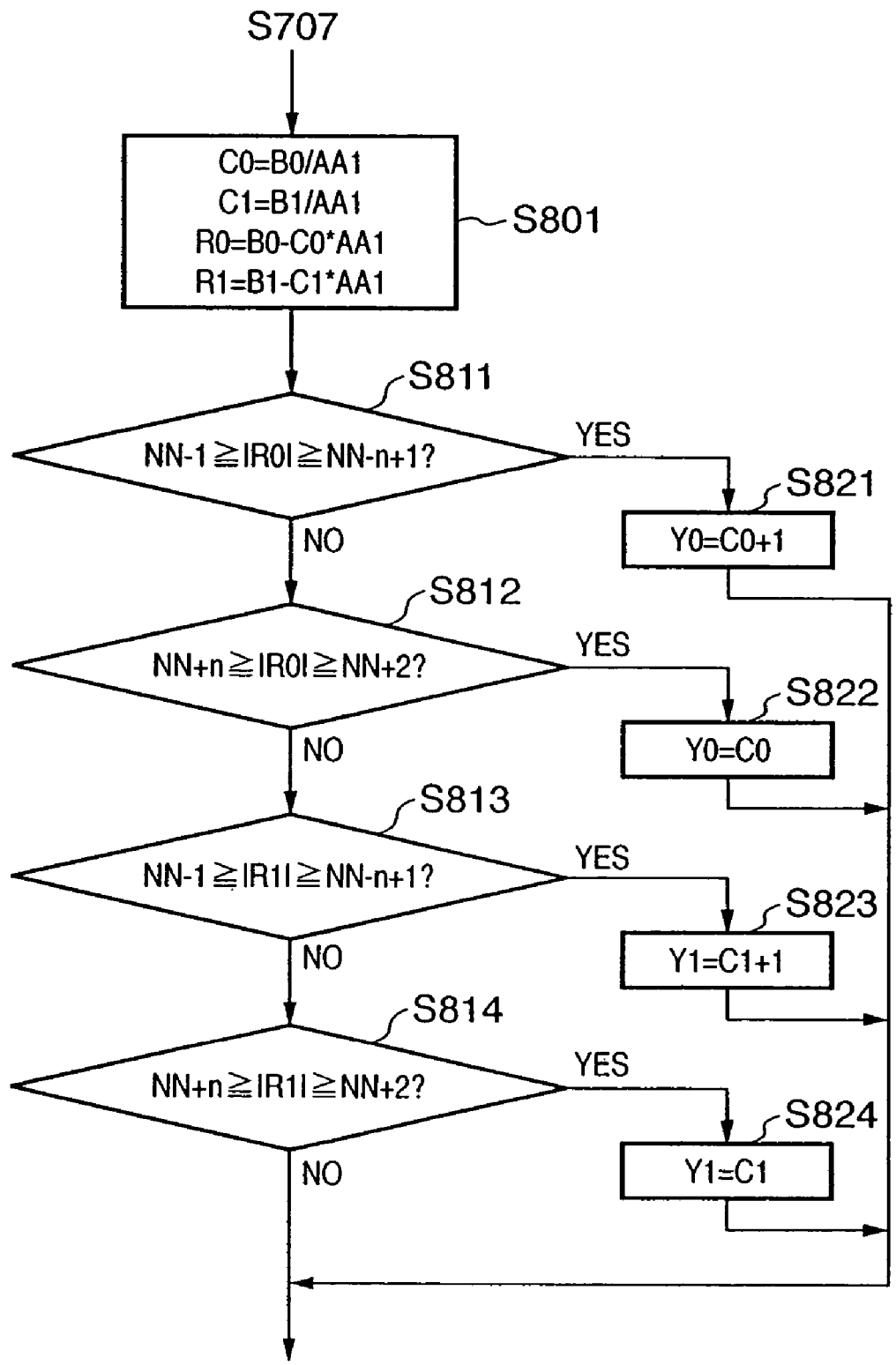
FIG. 9 is a diagram showing a flow of a lossless transformation process according to a fourth embodiment.

The basic idea is the same as that of the third embodiment, but the fourth embodiment provides a different processing method. A flowchart according to the fourth embodiment is shown in FIG. 9. Steps S701 to S707 of the third embodiment in FIG. 7 are applied to the fourth embodiment exactly as they are, and thus only those processes which replace the processes in FIG. 8 are shown in FIG. 9. The steps in FIG. 9 are as follows.

S801 is a process for calculating remainders when the sum-of-products is divided by the divisor (1+a*a);

S811 to S814 are a process for judging whether the remainders are subject to a reverse rounding-off process; and S821 to S824 are a process for performing a reverse rounding-off process based on the results of the judgment.

The term "rounding error" below means a rounding error multiplied by the divisor (1+a*a).

After a rounding-down process, the remainder becomes a negative rounding error. Thus, the negative rounding error is the remainder with its sign reversed. On the other hand, a positive rounding error is the value obtained by subtracting the remainder from the divisor.

Thus, the positive rounding error ("2n*n−1" to "2n*n−n+1"), after being translated into a remainder, ranges from "2n*n+n" to "2n*n+2". The resulting value is used in the judgment process in Steps S812 and S814.

Individual processes in FIG. 9 will be described below. In Step S801, results are received from the process in FIG. 7, the first and second results of the sum-of-products computation are divided by the divisor (1+a*a) and the quotients are rounded in such a way that the resulting integers C0 and C1 will be smaller than the quotients (to put it another way, floor functions are found by dividing the results of the sum-ofproducts computation by the divisor), and then remainders R0 and R1 are found using C0 and C1. According to these calculation results, the remainders fall within a range of 0 (inclusive) to the divisor even if the dividends are negative.

In Step S811, assuming that the rounding error is negative, it is judged whether the remainder R0 falls within a range subject to an inverse transformation process. If it is found that the remainder R0 falls within the range, the flow goes to Step S821, where Y0 is updated with the sum of C0 and 1 to obtain a quotient which has been rounded up.

In Step S812, assuming that the rounding error is positive, it is judged whether the remainder R0 falls within a range subject to an inverse transformation process. If it is found that the remainder R0 falls within the range, the flow goes to Step S822, where Y0 is updated with C0 to obtain a quotient which has been rounded down.

If the remainder R0 does not fall within the range under either condition, the calculation result in Step S707 becomes the value of Y0 as it is. This value has been rounded off.

In Steps S813 and S814, judgments are made concerning the remainder R1 in exactly the same manner as in Steps S811 and S812. In Steps S823 and S824, Y1 is updated according to the results of judgments.

These are details of the processes according to the fourth embodiment. The results obtained are the same as the third embodiment, and thus concrete numerical examples will be omitted.

Fifth Embodiment

According to the fifth embodiment, the lossless four-point transformation is applied to a two-dimensional 8-by-8 lossless DCT transformation and an example application of the lossless four-point orthogonal transformation to an encoding process will be described.

It is known that eight-point DCT is decomposed into a Hadamard transformation and a few two-point rotational transformations. The two-point rotational transformations include $\pi/16$ and $3\pi/16$ rotational transformations. These rotational transformations are placed at the end of the DCT process.

In the two-dimensional DCT, the Hadamard transformation and two-point rotational transformations must be performed from two directions: horizontal directional transformations and vertical directional transformations. When a two-dimensional transformation is viewed in terms of a matrix operation, the horizontal transformation of an 8-by-8 data matrix is implemented by a transformation matrix by which the data matrix is multiplied on the right and the vertical transformation is implemented by a transformation matrix by which the data matrix is multiplied on the left.

Since a DCT is decomposed into a Hadamard transformation and two-point rotational transformations as described above, a two-dimensional DCT can be implemented by multiplying the data matrix on the left and right by a plurality of transformation matrices corresponding to the transformations. It is in the basic nature of linear algebra that the left and right transformation matrices may be operated on in any order as long as they are operated on beginning with the innermost one close to the central data matrix. Thus, it is possible to perform $\pi/16$ and $3\pi/16$ rotational transformation processes from two directions lastly after completing all the other processes.

Figure 10:
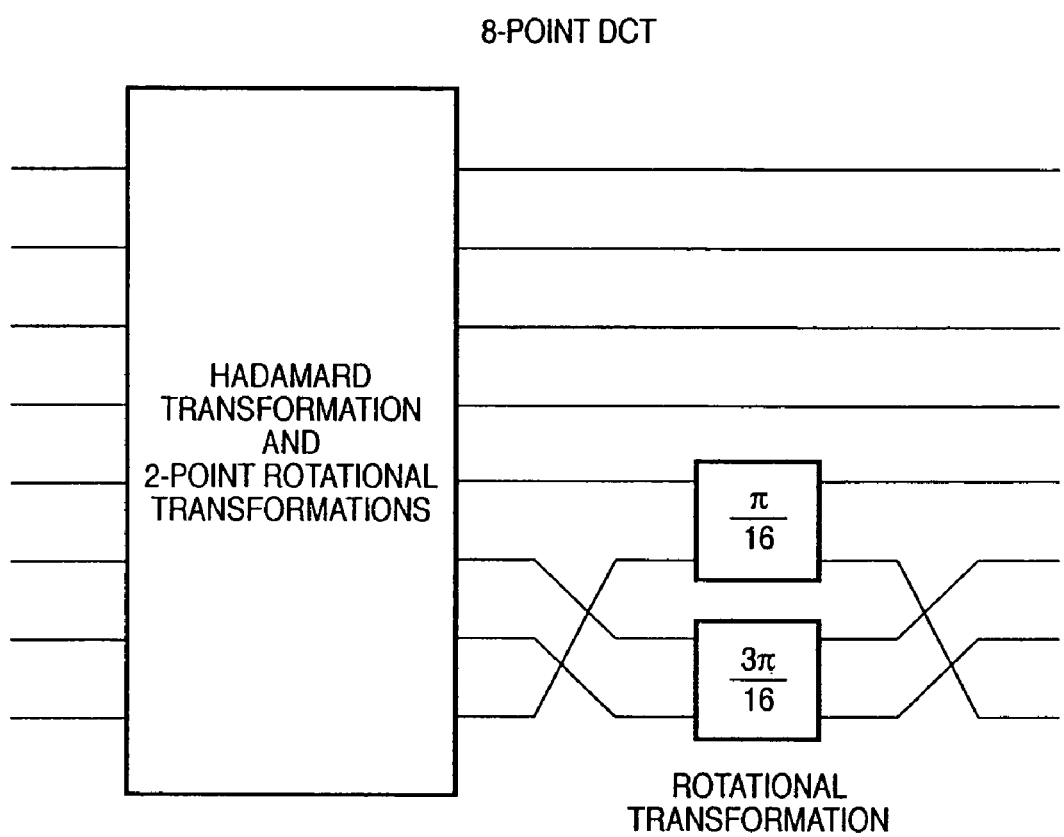
FIG. 10 is a diagram showing positions in π/16 and 3π/16 rotational processes in eight-point DCT.
Figure 11A:
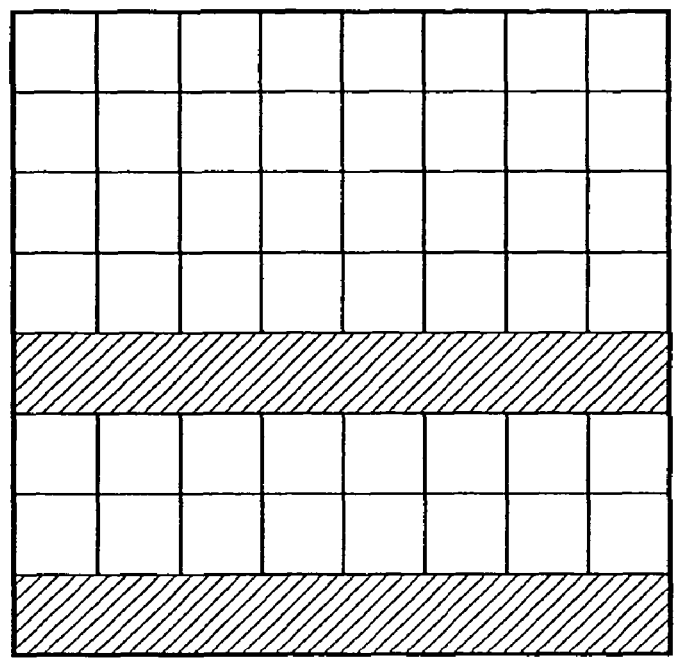
FIGS. 11A and 11B are diagrams showing data which undergo a π/16 rotational process among 8-by-8 data.

FIG. 10 shows a signal flow graph of $\pi/16$ and $3\pi/16$ rotational transformation processes from one direction. FIG. 11A is a diagram in which only data subjected to a $\pi/16$ rotational transformation process are indicated in 8-by-8 data. To apply a two-point rotational process performed on two items of data per column to all the eight columns, the data in the shaded areas in FIG. 11A are rotated. The data subjected to a rotational transformation from two directions are indicated by shaded areas in FIG. 11B.

Figure 12:
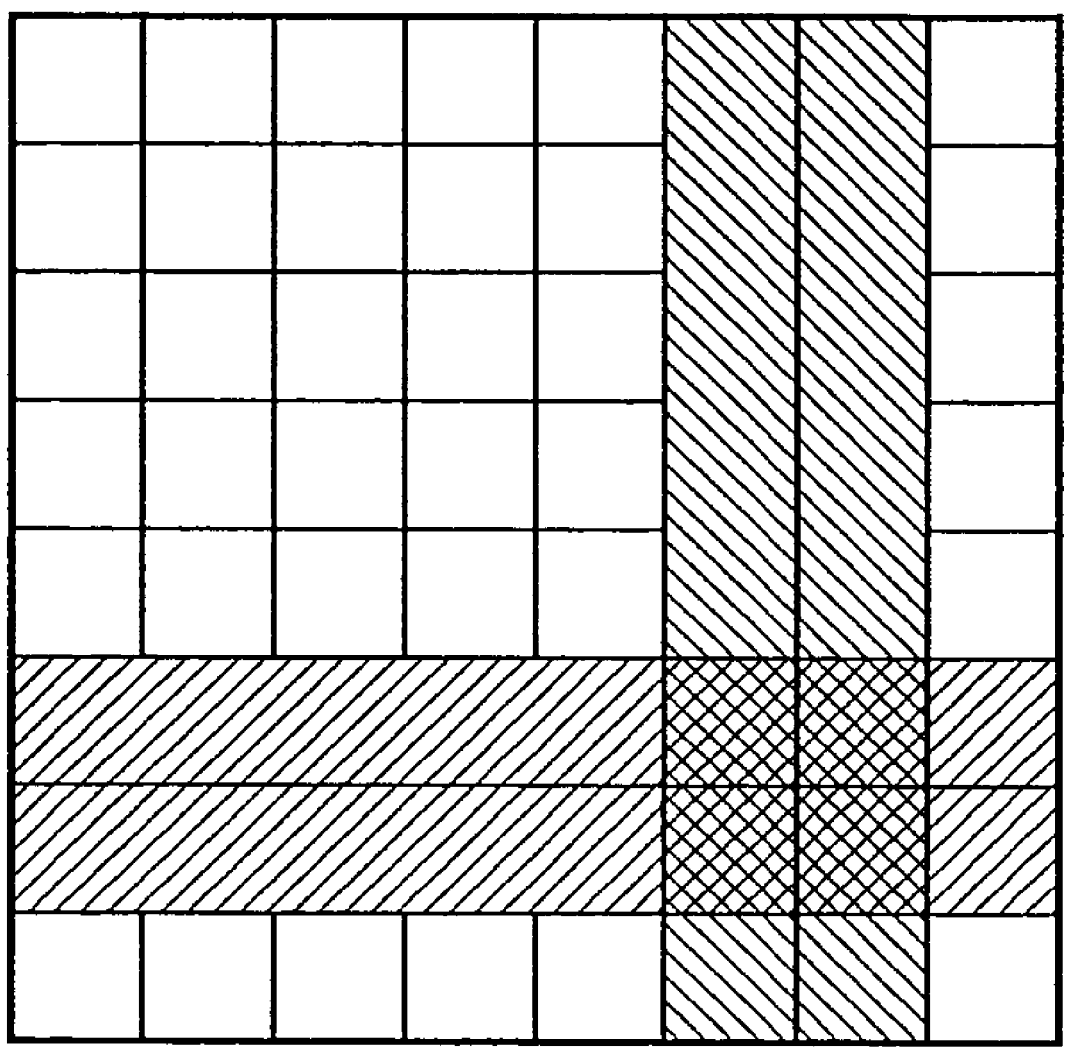
FIG. 12 is a diagram showing data which undergo a 3π/16 rotational process among 8-by-8 data.

Similarly, the data subjected to a $3\pi/16$ rotational transformation from two directions are indicated by shaded areas in FIG. 12.

Figure 11B:
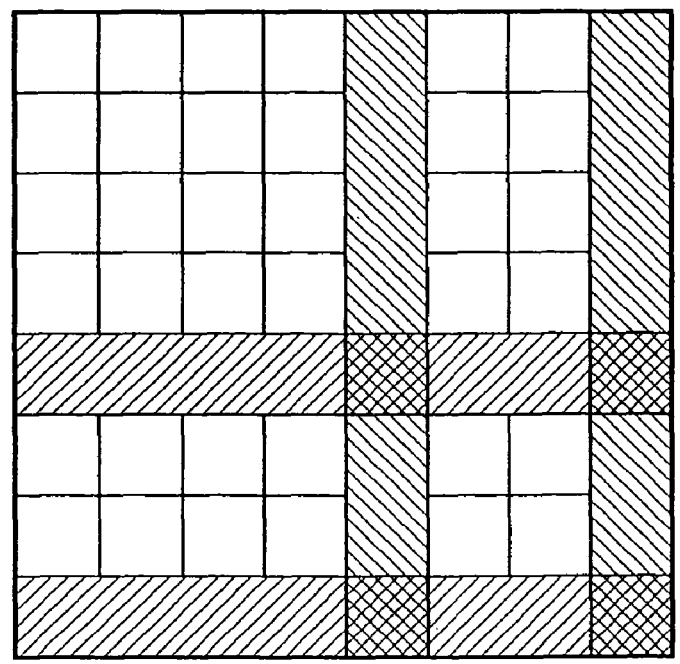

In FIG. 11B and FIG. 12, there are four items of data which are subjected to a rotational transformation from two directions. If the four items of data are denoted by X00, X01, X10, and X11, the rotational process performed on the data from two directions are given by Equation (4).

$$\begin{pmatrix} Y_{00} & Y_{01} \\ Y_{10} & Y_{11} \end{pmatrix} = \begin{pmatrix} \alpha & -\beta \\ \beta & \alpha \end{pmatrix} \begin{pmatrix} X_{00} & X_{01} \\ X_{10} & X_{11} \end{pmatrix} \begin{pmatrix} \alpha & \beta \\ -\beta & \alpha \end{pmatrix} = \quad (4)$$

$$\begin{pmatrix} \alpha^2 X_{00} - \alpha\beta X_{01} - \alpha\beta X_{10} + \beta^2 X_{11} & \alpha\beta X_{01} + \alpha^2 X_{01} - \beta^2 X_{11} - \alpha\beta X_{11} \\ \alpha\beta X_{01} - \beta^2 X_{01} + \alpha^2 X_{11} - \alpha\beta X_{11} & \beta^2 X_{00} + \alpha\beta X_{01} + \alpha\beta X_{10} + \alpha^2 X_{11} \end{pmatrix}$$

where $\alpha=\cos(\pi/16)$ and $\beta=\sin(\pi/16)$, or $\alpha=\cos(3\pi/16)$ and $\beta=\sin(3\pi/16)$.

The two-dimensional transformation in Equation (4) is rewritten into a one-dimensional transformation as follows.

$$\begin{pmatrix} Y_{00} \\ Y_{01} \\ Y_{10} \\ Y_{11} \end{pmatrix} = \begin{pmatrix} \alpha^2 & -\alpha\beta & -\alpha\beta & \beta^2 \\ \alpha\beta & \alpha^2 & -\beta^2 & -\alpha\beta \\ \alpha\beta & -\beta^2 & \alpha^2 & -\alpha\beta \\ \beta^2 & \alpha\beta & \alpha\beta & \alpha^2 \end{pmatrix} \begin{pmatrix} X_{00} \\ X_{01} \\ X_{10} \\ X_{11} \end{pmatrix} \quad (5)$$

The transformation matrix is turned upside down as follows.

$$\begin{pmatrix} Y_{11} \\ Y_{10} \\ Y_{01} \\ Y_{00} \end{pmatrix} = \begin{pmatrix} \beta^2 & \alpha\beta & \alpha\beta & \alpha^2 \\ \alpha\beta & -\beta^2 & \alpha^2 & -\alpha\beta \\ \alpha\beta & \alpha^2 & -\beta^2 & -\alpha\beta \\ \alpha^2 & -\alpha\beta & -\alpha\beta & \beta^2 \end{pmatrix} \begin{pmatrix} X_{00} \\ X_{01} \\ X_{10} \\ X_{11} \end{pmatrix} \quad (6)$$

Now, substituting $\alpha=m/\sqrt{(m^2+n^2)}$ and $\beta=n/\sqrt{(m^2+n^2)}$ into Equation (6), $$\begin{pmatrix} Y_{11} \\ Y_{10} \\ Y_{01} \\ Y_{00} \end{pmatrix} = \frac{1}{m^2+n^2} \begin{pmatrix} m^2 & m \cdot n & m \cdot n & n^2 \\ m \cdot n & -m^2 & n^2 & -m \cdot n \\ m \cdot n & n^2 & -m^2 & -m \cdot n \\ n^2 & -m \cdot n & -m \cdot n & m^2 \end{pmatrix} \begin{pmatrix} X_{00} \\ X_{01} \\ X_{10} \\ X_{11} \end{pmatrix} \quad (7)$$

Since Equation (7) can be obtained by substituting a=n/m in Equation (1) and multiplying the denominator of the fraction placed before the matrix and each element of the matrix by the second power of m, it can be seen that Equation (7) is equivalent to Equation (1).

Lossless transformations, which require a rounding process in order to convert data into integer data, involve transformation errors unlike normal linear transformations. This means that some approximate calculations during a lossless transformation process are permitted if the error resulting from the approximation is not larger than the error resulting from the rounding process.

Thus, the $\pi/16$ rotation is approximated by $\tan^{-1}(1/5)$ and the $3\pi/16$ rotation is approximated by $\tan^{-1}(2/3)$. Errors in rotation angles caused by the approximations are 0.533% and −0.178%, respectively. The ratio of ±0.5 rounding error to a 255-level value is 0.196%. When the level value is small, the ratio increases in inverse proportion to the level value. In view of these circumstances, it can be said that there is no problem at all in approximating $3\pi/16$ rotation by $\tan^{-1}(2/3)$ and that there is almost no problem in approximating $\pi/16$ rotation by $\tan^{-1}(1/5)$ compared to repeated rounding operations in conventional methods.

When the $\pi/16$ rotation is approximated by $\tan^{-1}(1/5)$, the four-point orthogonal transformation matrix is given by Equation (8) which results when m=5 and n=1 are substituted into Equation (7). This is equivalent to a transformation obtained by setting a=5 in the transformation according to the first embodiment described earlier. Therefore, the processing method according to the first embodiment can implement a lossless transformation.

$$\begin{pmatrix} Y_{11} \\ Y_{10} \\ Y_{01} \\ Y_{00} \end{pmatrix} = \frac{1}{5^2 + 1^2} \begin{pmatrix} 5^2 & 5 & 5 & 1 \\ 5 & -5^2 & 1 & -5 \\ 5 & 1 & -5^2 & -5 \\ 1 & -5 & -5 & 5^2 \end{pmatrix} \begin{pmatrix} X_{00} \\ X_{01} \\ X_{10} \\ X_{11} \end{pmatrix} \quad (8)$$

On the other hand, when the $3\pi/16$ rotation is approximated by $\tan^{-1}(2/3)$, the four-point orthogonal transformation matrix is given by Equation (9) which results when m=3 and n=2 are substituted into Equation (7).

$$\begin{pmatrix} Y_{11} \\ Y_{10} \\ Y_{01} \\ Y_{00} \end{pmatrix} = \frac{1}{3^2 + 2^2} \begin{pmatrix} 3^2 & 6 & 6 & 2^2 \\ 6 & -3^2 & 2^2 & -6 \\ 6 & 2^2 & -3^2 & -6 \\ 2^2 & -6 & -6 & 3^2 \end{pmatrix} \begin{pmatrix} X_{00} \\ X_{01} \\ X_{10} \\ X_{11} \end{pmatrix} \quad (9)$$

In this case, a lossless transformation can be implemented using a regular rounding-off process both during transformation and inverse transformation. Specifically, this can be done by adding 6 to the dividends, dividing them by 13, and rounding quotients in such a way that the resulting values will be smaller than the quotients. If m and n are integers and the difference between them is 1 in the transformation of Equation (7), a lossless transformation from integer vectors into integer vectors can be implemented by rounding off the quotients in a regular manner.

From the above description, it can be understood that the lossless four-point orthogonal transformation according to the present invention is applicable to part of processing in a two-dimensional 8-by-8 lossless DCT.

Incidentally, the inventor has already proposed a two-dimensional 4-by-4 lossless Hadamard transformation most suitable for a two-dimensional 8-by-8 lossless DCT (Japanese Patent Laid-Open No. 2004-038451). By using the Hadamard transformation and the lossless four-point orthogonal transformation according to this embodiment and applying conventional two-point rotational transformations to other rotational transformations, it is possible to implement a two-dimensional 8-by-8 lossless DCT which produces smaller rounding errors than do conventional methods.

Figure 13:
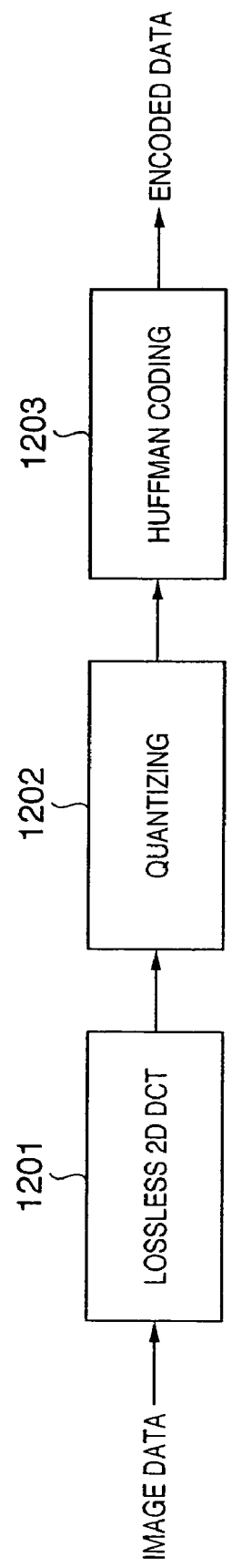
FIG. 13 is a diagram showing a configuration for an encoding process.

By subjecting image data to the two-dimensional 8-by-8 lossless DCT and subjecting the resulting transform coefficients to a quantizing process and Huffman coding process, it is possible to obtain JPEG-encoded data as shown in FIG. 13.

If all quantizing steps are set to "1," the lossless DCT coefficients are converted into entropy codes directly, enabling lossless encoding. That is, if a lossless inverse DCT (not shown) corresponding to the lossless DCT is performed during a decoding process, the original data can be restored completely.

On the other hand, if a decoding process is performed by a typical JPEG decoder not equipped with a lossless inverse DCT function, the original data cannot be restored completely, resulting in data superimposed with rounding errors produced during the lossless inverse transformation process. However, the difference cannot be recognized visually, and there is no problem when only viewing encoded original images.

Lossless encoding can be carried out if the quantizing steps are set to "1," and lossy encoding with some degradation can be carried out if the quantizing steps are set to a value larger than "1." This makes it possible to control the quality of compressed/decompressed images continuously from lossless to lossy.

As described above, the present invention includes: multiplication means for multiplying four items of vector data by a four-by-four matrix consisting of integer elements; means for adding integer values to results of the multiplication; and division means for rounding results of division in such a way that resulting integers will be smaller than the results of division, wherein the adding means adds integer data smaller than half a divisor to at least one item of data. Consequently, the present invention can implement a lossless four-point orthogonal transformation with reduced rounding errors.

Also, the present invention includes: multiplication means for multiplying four items of vector data by a four-by-four integer matrix; means for adding integer values to results of the multiplication; division means for rounding quotients in such a way that resulting integers will be smaller than the quotients; error calculation means for finding rounding errors in the quotients; means for judging whether the rounding errors fall within a predetermined range; means for judging whether the rounding errors are positive or negative, wherein 1 is added or subtracted to/from one of the four quotients based on results of the judgment. Consequently, the present invention can implement a lossless four-point orthogonal transformation with reduced rounding errors. Various fast computational algorithms are available for such integer matrices and can be used to perform transformation processes at high speed.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-242634 filed on Aug. 23, 2004, which is hereby incorporated by reference herein.

What is claimed is:

1. A data transformation apparatus that receives four items of vector data X0, X1, X2, and X3 expressed in terms of integers and obtains transformed data expressed in terms of integers, the data transformation apparatus including a circuit comprising:

a register that receives and holds the vector data X0, X1, X2, and X3;

a first computing unit performing an operation D0=X0+aX1+aX2+$a^2$X3;

a second computing unit performing an operation D1=aX0−X1+$a^2$X2−aX3;

a third computing unit performing an operation D2=aX0+$a^2$X1−X2−aX3;

a fourth computing unit performing an operation D3=$a^2$X0−aX1−aX2+X3 wherein the coefficient "a" is an odd number larger than 1, wherein the vector data X0, X1, X2, and X3 held by the register are provided to the first to fourth computing units;

a corrective computing unit adding integer data smaller than half a divisor {1+$a^2$} to an odd number of the data D0, D1, D2, and D3 obtained by the first to fourth computing units and adding a value equal to half the divisor {1+$a^2$} to the rest of the data D0, D1, D2, and D3, and thereby calculating correction data D0', D1', D2', and D3' to be divided; and a divider dividing the correction data D0', D1', D2', and D3' obtained by the corrective computing unit by the divisor {1+$a^2$}, rounding results of division in such a way that resulting integers will be smaller than the results of division, and outputting the resulting integers as approximate transformed data of a matrix operation:

$$\frac{1}{1+a^2}\begin{pmatrix} 1 & a & a & a^2 \\ a & -1 & a^2 & -a \\ a & a^2 & -1 & -a \\ a^2 & -a & -a & 1 \end{pmatrix}\begin{pmatrix} X0 \\ X1 \\ X2 \\ X3 \end{pmatrix}.$$

2. A data transformation method performed by a data transformation apparatus that includes a circuit that receives four items of vector data X0, X1, X2, and X3 expressed in terms of integers and obtains transformed data expressed in terms of integers, the data transformation method comprising:

a holding step of receiving and holding the vector data X0, X1, X2, and X3;

a first computational step of performing an operation D0=X0+aX1+aX2+$a^2$X3;

a second computational step of performing an operation D1=aX0−X1+$a^2$X2−aX3;

a third computational step of performing an operation D2=aX0+$a^2$X1−X2−aX3;

a fourth computational step of performing an operation D3=$a^2$X0−aX1−aX2+X3;

wherein the coefficient "a" is an odd number larger than 1;

a step of providing the vector data X0, X1, X2, and X3 held in the holding step for use in the first to fourth computational steps;

a corrective computational step of adding integer data smaller than half a divisor {1+$a^2$} to an odd number of the data D0, D1, D2, and D3 obtained by the first to fourth computational step and adding a value equal to half the divisor {1+$a^2$} to the rest of the data D0, D1, D2, and D3, and thereby calculating correction data D0', D1', D2', and D3' to be divided; and an output step of dividing the correction data D0', D1', D2', and D3' obtained by the corrective computational step by the divisor, rounding results of division in such a way that resulting integers will be smaller than the results of division, and outputting the resulting integers as approximate transformed data of a matrix operation:

$$\frac{1}{1+a^2}\begin{pmatrix} 1 & a & a & a^2 \\ a & -1 & a^2 & -a \\ a & a^2 & -1 & -a \\ a^2 & -a & -a & 1 \end{pmatrix}\begin{pmatrix} X0 \\ X1 \\ X2 \\ X3 \end{pmatrix}.$$

3. A data transformation apparatus that receives four items of vector data X0, X1, X2, and X3 expressed in terms of integers with m significant bits and obtains transformed data Y0, Y1, Y2, and Y3 expressed in terms of integers with m significant bits, the data transformation apparatus including a circuit comprising:

a register that receives and holds the vector data X0, X1, X2, and X3;

a first computing unit performing an operation D0=X0+aX1+aX2+$a^2$X3;

a second computing unit performing an operation D1=aX0−X1+$a^2$X2−aX3;

a third computing unit performing an operation D2=aX0+$a^2$X1−X2−aX3;

a fourth computing unit performing an operation D3=$a^2$X0−aX1−aX2+X3;

wherein the coefficient "a" is an odd number larger than 1;

wherein the vector data X0, X1, X2, and X3 held by the register are provided to the first to fourth computing units;

an adder adding half a divisor (1+$a^2$) to the data D0, D1, D2, and D3 obtained by the first to fourth computing units;

a multiplier multiplying an odd number of the data outputted from the adder by a value R1 and multiplying the rest of the data outputted by the adder by a value R0, where R0 is an integer quotient obtained by dividing $2^n$ by the divisor (1+$a^2$), where n is the number of significant bits in the operation, and R1 is an integer value obtained by adding 1 to R0; and a shifter shifting multiplication results produced by the multiplier n bits to the right in order to divide the multiplication results by $2^2$, and outputting the resulting integers as approximate transformed data of a matrix operation:

$$\frac{1}{1+a^2}\begin{pmatrix} 1 & a & a & a^2 \\ a & -1 & a^2 & -a \\ a & a^2 & -1 & -a \\ a^2 & -a & -a & 1 \end{pmatrix}\begin{pmatrix} X0 \\ X1 \\ X2 \\ X3 \end{pmatrix}.$$

4. A data transformation method performed by a data transformation apparatus that includes a circuit that receives four items of vector data X0, X1, X2, and X3 expressed in terms of integers with m significant bits and obtains transformed data Y0, Y1, Y2, and Y3 expressed in terms of integers with m significant bits, the data transformation method comprising:

a holding step of receiving and holding the vector data X0, X1, X2, and X3 in the circuit;

a first computational step of performing an operation D0=X0+aX1+aX2+a²X3;

a second computational step of performing an operation D1=aX0−X1+a²X2−aX3;

a third computational step of performing an operation D2=aX0+a²X1−X2−aX3;

a fourth computational step of performing an operation D3=a²X0−aX1−aX2+X3, wherein the coefficient "a" is an odd number larger than 1;

an allocation step of allocating the vector data X0, X1, X2, and X3 held by the holding step to the first to fourth computational steps;

an adding step of adding half a divisor (1+a²) to the data D0, D1, D2, and D3 obtained by the first to fourth computational step;

a multiplication step of multiplying an odd number of the data outputted from the adding step by a value R1 and multiplying the rest of the data outputted from the adding step by a value R0, where R0 is an integer quotient obtained by dividing $2^n$ by the divisor (1+a²), where n is the number of significant bits in the operation, and R1 is an integer value obtained by adding 1 to R0; and a shifting step of shifting multiplication results produced by the multiplication step n bits to the right in order to divide the multiplication results by $2^n$, and outputting the resulting integers as approximate transformed data of a matrix operation:

$$\frac{1}{1+a^2}\begin{pmatrix} 1 & a & a & a^2 \\ a & -1 & a^2 & -a \\ a & a^2 & -1 & -a \\ a^2 & -a & -a & 1 \end{pmatrix}\begin{pmatrix} X0 \\ X1 \\ X2 \\ X3 \end{pmatrix}.$$

5. A data transformation apparatus, the data transformation apparatus including a circuit comprising:

a multiply and accumulation unit that multiplies vector data consisting of four integers X0, X1, X2, and X3 to obtain four data D0, D1, D2, and D3 by a matrix below:

$$\begin{pmatrix} 1 & a & a & a^2 \\ a & -1 & a^2 & -a \\ a & a^2 & -1 & -a \\ a^2 & -a & -a & 1 \end{pmatrix}$$

wherein "a" is an even number equal to or larger than 4, an adder that adds an integer value a²/2 or an approximate integer value of a²/2 to the computational results four data D0, D1, D2, and D3 to obtain four data D0', D1', D2', and D3';

a divider that finds four quotients of the data D0', D1', D2', and D3' using a divisor 1+a²;

an error calculation unit that finds rounding errors in the quotients; and a judging unit that judges whether the rounding errors fall within a predetermined range, wherein 1 is added to or subtracted from part of the four quotients based on results of the judging.

6. A data transformation method performed by a data transformation apparatus that includes a circuit that performs the method comprising:

a multiply and accumulation step of multiplying vector data including four integers X0, X1, X2, and X3 by a matrix below;

$$\begin{pmatrix} 1 & a & a & a^2 \\ a & -1 & a^2 & -a \\ a & a^2 & -1 & -a \\ a^2 & -a & -a & 1 \end{pmatrix}$$

to obtain four data D0, D1, D2, and D3, wherein "a" is an even number equal to or larger than 4;

a step of adding an integer value a²/2 or an approximate integer value of a²/2 to the results of performing the multiply and accumulation step D0, D1, D2, and D3 to obtain D0', D1', D2', and D3';

a division step of finding four quotients of the data D0', D1', D2', and D3' using a divisor 1+a²;

an error calculation step of finding rounding errors in the four quotients D0', D1', D2', and D3'; and a step of judging, by the circuit, whether the rounding errors fall within a predetermined range, wherein 1 is added to or subtracted from part of the four quotients based on results of the judging.

7. A apparatus data transformation apparatus according to claim 1, wherein the data transformation apparatus is incorporated into a two-dimensional DCT apparatus.

8. A data transformation apparatus according to claim 1, wherein the data transformation apparatus is incorporated into a lossless encoding apparatus.

9. A data transformation apparatus according to claim 3, wherein the data transformation apparatus is incorporated into a two-dimensional DCT apparatus.

10. A data transformation apparatus according to claim 3, wherein the data transformation apparatus is incorporated into a lossless encoding apparatus.

* * * * *